(12) United States Patent
Tanaka et al.

(10) Patent No.: US 6,210,048 B1
(45) Date of Patent: Apr. 3, 2001

(54) CAMERA INCLUDING AN IMPROVED DRIVE MECHANISM

(75) Inventors: Yoshiharu Tanaka, Kawachinagano; Junichi Tanii, Izumi; Ikushi Nakamura, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/164,575

(22) Filed: Oct. 1, 1998

(30) Foreign Application Priority Data

Oct. 2, 1997 (JP) .................................................. 9-270055

(51) Int. Cl.⁷ ...................................................... G03B 1/00
(52) U.S. Cl. .......................................... 396/418; 396/513
(58) Field of Search ................................... 396/387, 411, 396/413, 418, 513, 536

(56) References Cited

U.S. PATENT DOCUMENTS 5,574,522 * 11/1996 Matsukawa ........................... 396/411
5,727,244 * 3/1998 Kitazawa .............................. 396/411

FOREIGN PATENT DOCUMENTS 9-211590   8/1997  (JP) .

* cited by examiner

*Primary Examiner*—David M. Gray
(74) *Attorney, Agent, or Firm*—Burns, Doane, Swecker & Mathis, LLP

(57) ABSTRACT

A camera has at least one motor, a spindle gear (i.e. a gear having a spindle) for rewinding and thrusting a film, a cam that rotates together with the spindle gear when the spindle gear is rotated in a film-rewinding direction and that remains at rest when the spindle gear is rotated in a film-thrusting direction, a direction-limiting mechanism for permitting the spindle gear to rotate in the film-rewinding direction only when the motor is rotating in a forward direction, and a transmission mechanism that comes into contact with the cam when the motor is rotating in a reverse direction and that, when the cam is in one of predetermined rotation positions, engages with and thereby transmits a driving force of the motor to a corresponding one of driven members provided one for each of the predetermined rotation positions. In this camera, paths for transmitting the driving force of the motor are switched by first rotating the spindle gear in the film-rewinding direction to bring the cam into one of the predetermined rotation positions and then reversing a rotation direction of the motor.

26 Claims, 19 Drawing Sheets

FIG.21A  *PRIOR ART*
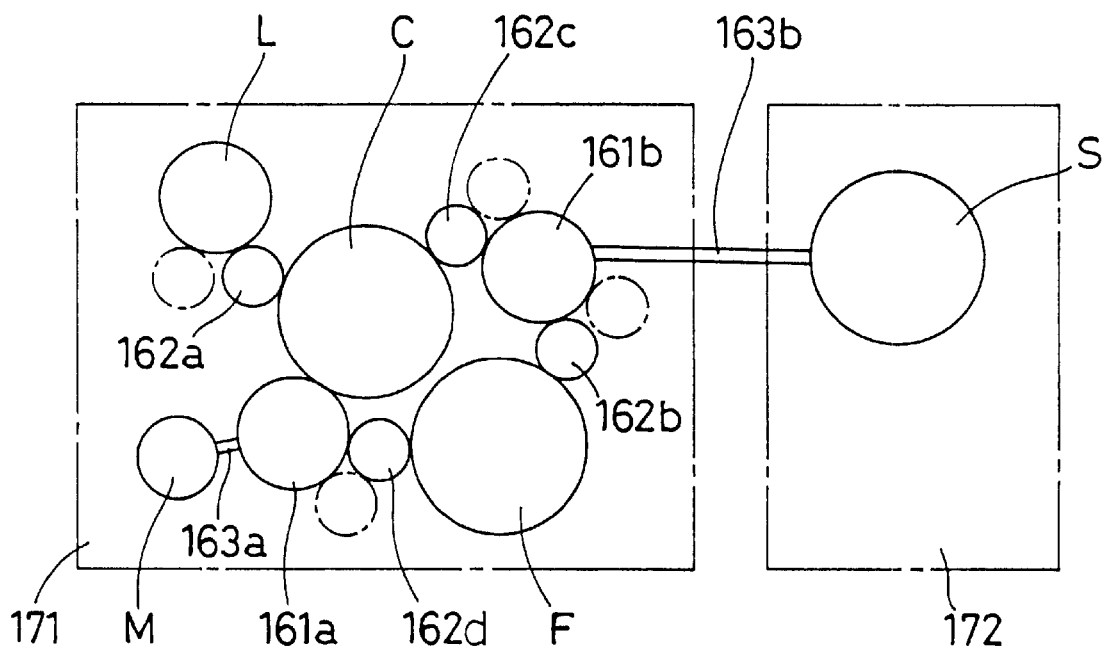
FIG.21B
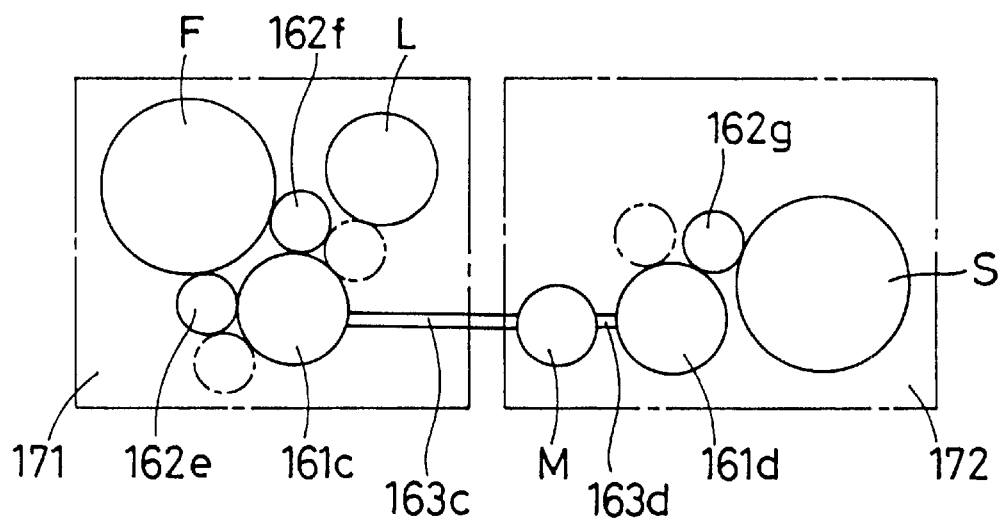

CAMERA INCLUDING AN IMPROVED DRIVE MECHANISM

This application is based on application No. H09-270055 filed in Japan, the content of which is hereby incorporated by reference.

BACKGROUND OF THE INVENTION

1. Field of the Invention

The present invention relates to a camera supporting the advanced photo system, and more particularly, to a camera being small in size and having minimum functions necessary for the new photographic system.

2. Description of the Prior Art

In recent years, a new photographic system called advanced photo system (hereinafter, referred to as new system) has been introduced, and cameras and films supporting this system have been commercialized. This system has been spreading because it is superior to the conventional system using the 135 film in camera size reduction and convenience in photographing.

First, a film supporting the new system will briefly be described. FIGS. 1 and 2 are perspective views of a film cartridge for the new system (hereinafter, referred to as cartridge 1) viewed from above and below, respectively. A film 10 is housed being wound around a rotatable spool 3 in the cartridge 1 and the spool 3 can receive rotation from a driving system of the camera by a subsequently-described spindle key being engaged in a key groove 3a formed in the spool 3. A light lock door 6 is provided at a film outlet 5. A subsequently-described opening and closing key of a predetermined configuration is inserted into a key hole 4 having a locking portion 4a and a rotary portion 4b, and is rotated in the key hole 4, so that the light lock door 6 is opened. This enables the film 10 to be sent out.

On the side of the upper surface 1a of the cartridge 1, a data disk 2 rotatable integrally with the spool 3 is fixed. On the data disk 2, film information such as the number of exposures and the ISO speed of the film is recorded by means of a bar code 2a. The film information can be read out by an optical sensor provided in the camera. At the lower surface 1b of the cartridge 1, marks 7 ("unused" 7a, "exposed partway" 7b, "fully exposed" 7c and "developed" 7d) representing the film use condition are provided. The film use condition is indicated by one of the marks 7 being displayed in white according to the stop position of a white indicator 8 rotatable integrally with the spool 3 (in FIG. 2, the film use condition is "unused" 7a).

Since the relative positions of the indicator 8, the bar code 2a and the key groove 3a are fixed, the position of the indicator 8 can be recognized by the optical sensor for reading out the bar code 2a or a mechanism for detecting the position of the subsequently-described spindle key rotatable integrally with the key groove 3a. The operation of stopping the indicator 8 at one of the positions of the "unused" 7a, the "exposed partway" 7b, the "fully exposed" 7c and the "developed" 7d will be called VEI setting (VEI is an abbreviation of "visual exposure information").

In a typical camera supporting the new system, as shown in FIG. 3, a cartridge chamber 21 where the cartridge 1 is loaded is disposed on one side of a camera 20, and a cartridge chamber lid 22 for insertion of the cartridge 1 is provided at an end of the cartridge chamber 21. On the other side of the camera 20, a winding spool 26 for winding the film 10 therearound is disposed.

When the cartridge 1 is loaded into the cartridge chamber 21, the light lock door 6 of the cartridge 1 is opened, the film use condition is determined based on the position of the data disk 2, and the film information is read out from the bar code 2a formed on the data disk 2. When the film use condition is "unused", an operation to transport the film 10 to the first frame is necessary. When the film use condition is "exposed partway", an operation to wind the film 10 being exposed partway around the winding spool 26 is necessary. When the cartridge 1 is taken out, an operation to record the film use condition on the film cartridge 1 according to the position of the indicator 8 and close the light lock door 6 is necessary. Since these operations are complicated, automatic control by motor driving is indispensable. At present, winding and rewinding the film 10 by motor driving is a function provided in most cameras. In addition to this function, cameras are desired to have a function to automatically perform an operation to lock and a unlock the cartridge chamber lid 22 in order to prevent the film 10 from being damaged by the user inadvertently opening the cartridge chamber lid 22 during photographing.

An example of operations necessary for the motor driving and other operations will be described on the time series by use of a brief flowchart shown in FIG. 4. In the figure, the operations enclosed by broken lines are manually performed by the user According to the flowchart, first, the cartridge 1 is loaded into the cartridge chamber 21 and the cartridge chamber lid 22 is closed (operation number 201). Then, the cartridge chamber lid 22 is automatically locked (202) and the light lock door 6 is opened (203). Then, the spool 3 is rotated in the rewinding direction, and the position of the data disk 2 and the data on the data disk 2 are read out (204, 205). When the film use condition is "fully exposed" or "developed", the operation shifts to the subsequently-described VEI setting. When the film use condition is "unused" or "exposed partway", the film 10 is sent out (206, hereinafter, this operation will be referred to as thrust driving), it is detected that the tip of the film 10 is caught by the winding spool 26 (207), the film 10 is wound up around the spool 26 until the first frame or the first unexposed frame (208, 209) reaches an exposure portion of the camera and the operation is stopped. These operations will be referred to as initial loading.

When the user turns on a rewinding switch (210), the operation shifts to a subsequently-described rewinding driving. When the user performs photographing (211), winding-up driving is performed by one frame for each photographing (212). When all the frames have been exposed (213), rewinding driving of the film 10 is performed (214), the VEI setting is performed to stop the indicator 8 at a position corresponding to the film use condition and the operation is stopped (215). When the user turns on a switch for unlocking the cartridge chamber lid 22 (216), the light lock door 6 is closed (217) and the cartridge chamber lid 22 is unlocked (216), so that the cartridge chamber lid 22 is openable (219).

A driving mechanism of a camera capable of performing the above-described series of operations is disclosed, for example, in Japanese Laid-open Patent Application No. H9-211590.

In the driving mechanism of this conventional example, a planet gear is provided for each of the operations of winding-up driving, rewinding driving, thrust driving, opening and closing driving of the light lock door 6 (including the cartridge chamber lid locking mechanism), and the operations are controlled by contact between a cam and followers of planet carriers holding the planet gears. For this reason, the number of parts is large, so that size reduction of the camera is difficult and the cost increases.

SUMMARY OF THE INVENTION

An object of the present invention is to provide a camera having a driving mechanism enabling reduction in the number of parts, not requiring a large space and being excellent in cost performance although having necessary functions.

To achieve the above object, according to one aspect of the present invention, a camera is provided with: at least one motor; a spindle gear (i.e. a gear having a spindle) for rewinding and thrusting a film; a cam that rotates together with the spindle gear when the spindle gear is rotated in a film-rewinding direction and that remains at rest when the spindle gear is rotated in a film-thrusting direction; a direction-limiting mechanism for permitting the spindle gear to rotate in the film-rewinding direction only when the motor is rotating in a forward direction; and a transmission mechanism that comes into contact with the cam when the motor is rotating in a reverse direction and that, when the cam is in one of predetermined rotation positions, engages with and thereby transmits a driving force of the motor to a corresponding one of driven members provided one for each of the predetermined rotation positions. In addition, in this camera, paths for transmitting the driving force of the motor are switched by first rotating the spindle gear in the film-rewinding direction to bring the cam into one of the predetermined rotation positions and then reversing a rotation direction of the motor.

According to another aspect of the present invention, a camera is provided with: at least one motor disposed inside the camera; a driving-force transmission unit for transmitting a driving force of the motor; a film cartridge chamber disposed in a side portion of the camera and having an opening through which a film cartridge is loaded and unloaded; a first sun gear that receives the driving force of the motor from the driving-force transmission unit and that is disposed above the film cartridge chamber; a spindle gear (i.e. a gear having a spindle) to which the driving force of the motor is transmitted by rotation of the first sun gear when necessary; a keyed spindle fixed on the spindle gear so as to rotate together therewith and so as to protrude therefrom into the film cartridge chamber to be fitted into a spool of the film cartridge; a spindle key formed on the keyed spindle so as to be fitted into a key groove formed in the spool to make the spool rotate together with the keyed spindle; a cam that rotates together with the spindle gear when the spindle gear is rotated in a direction in which a film is rewound back into the film cartridge and that remains at rest when the spindle gear is rotated in a direction in which the film is thrust out of the film cartridge; a light-lock door driving gear to which the driving force of the motor is transmitted by rotation of the first sun gear when necessary; a light-lock door driving mechanism for opening and closing a light-lock door of the film cartridge by using rotation of the light-lock door driving gear; a film winder disposed in an opposite side portion of the camera; a second sun gear disposed near the film winder; a spool gear to which rotation of the second sun gear is transmitted when necessary; a winding spool that rotates together with the spool gear to wind up the film pulled out of the film cartridge; a first transmission mechanism for transmitting a driving force of the first sun gear to drive the spindle gear in the film-rewinding direction; a second transmission mechanism for transmitting the driving force of the first sun gear to drive the spindle gear in the film-thrusting direction; a third transmission mechanism for transmitting the driving force of the first sun gear to the light-lock door driving gear; and a fourth transmission mechanism for transmitting a driving force of the second sun gear to the spool gear. In addition, in this camera, paths for transmitting the driving force of the motor are switched by selecting at least one of the second to fourth transmission mechanisms by first rotating the spindle gear in the film-rewinding direction to bring the cam into a predetermined rotation position and then reversing a rotation direction of the motor.

BRIEF DESCRIPTION OF THE DRAWINGS

This and other objects and features of this invention will become clear from the following description, taken in conjunction with the preferred embodiments with reference to the accompanied drawings in which:

FIG. 21A is a schematic view showing the structure of the gears of the conventional example;

FIG. 21B is a schematic view showing the structure of the gears of the first embodiment of the present invention;

DESCRIPTION OF THE PREFERRED EMBODIMENTS

Figure 5A:
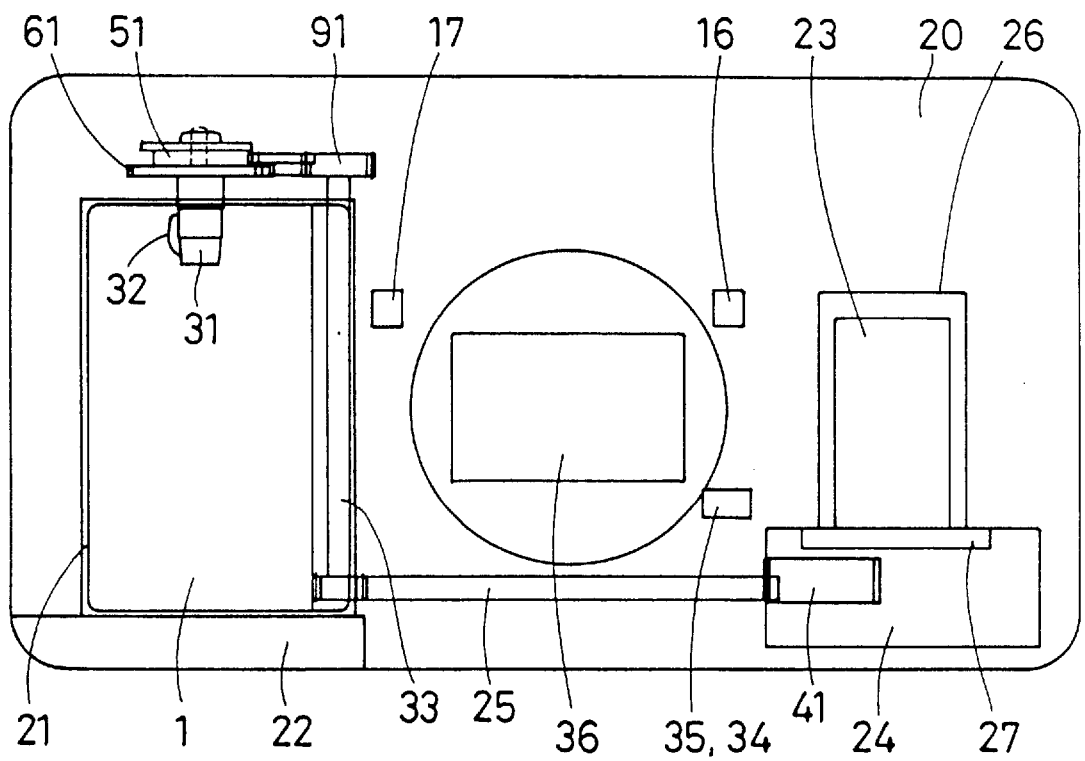
FIG. 5A is a front view showing the structure of a camera according to a first embodiment of the present invention.
Figure 5B:
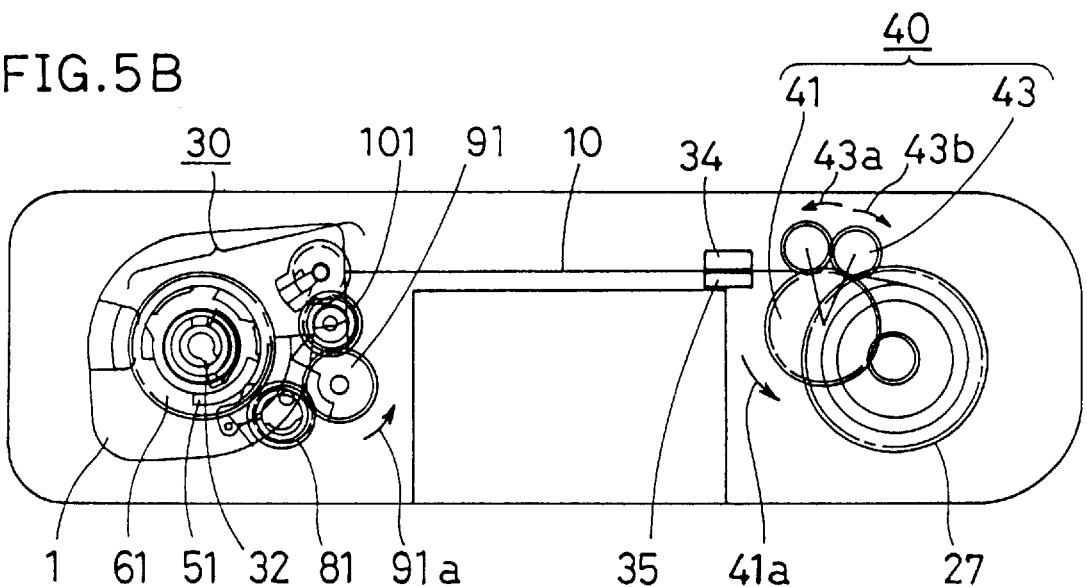
FIG. 5B is an upper view showing the structure of the camera according to the first embodiment of the present invention.

A first embodiment of the present invention will be described with reference to the drawings. FIG. 5A is a front perspective view of a camera 20 of the embodiment. FIG. 5B is an upper perspective view thereof. A cartridge chamber 21 where a cartridge 1 is loaded is disposed on the left side viewed from the front A winding spool 26 for winding a film 10 therearound is disposed on the right side.

Figure 1:
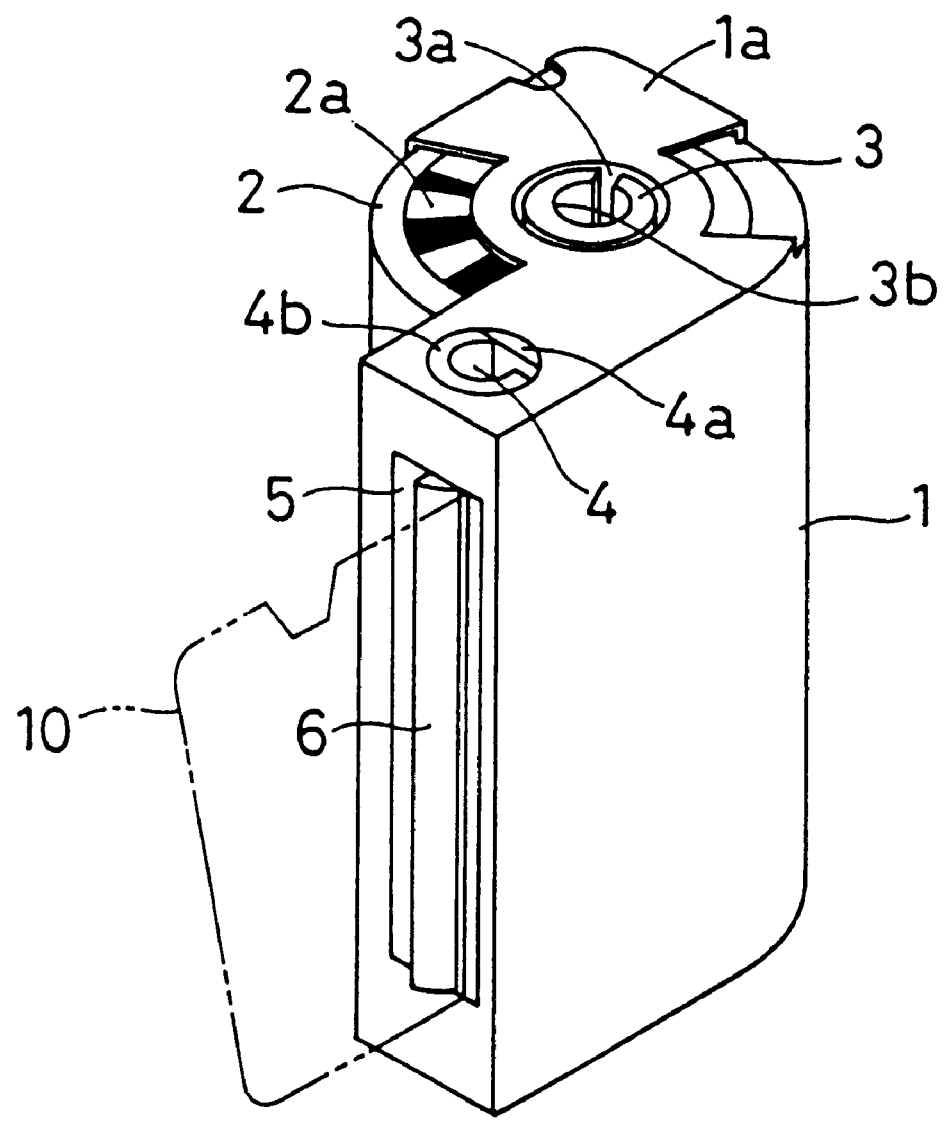
FIG. 1 is an upper perspective view showing the structure of the film cartridge.
Figure 2:
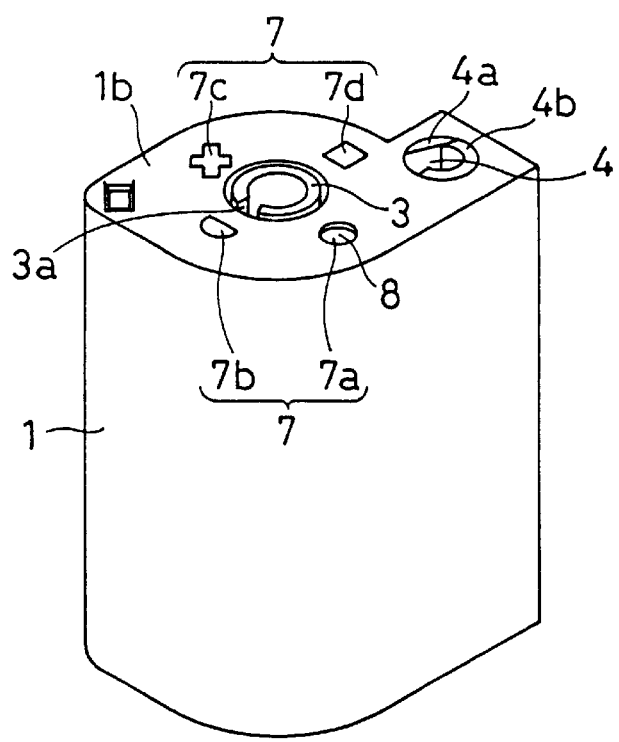
FIG. 2 is a lower perspective view showing the structure of the film cartridge.
Figure 3:
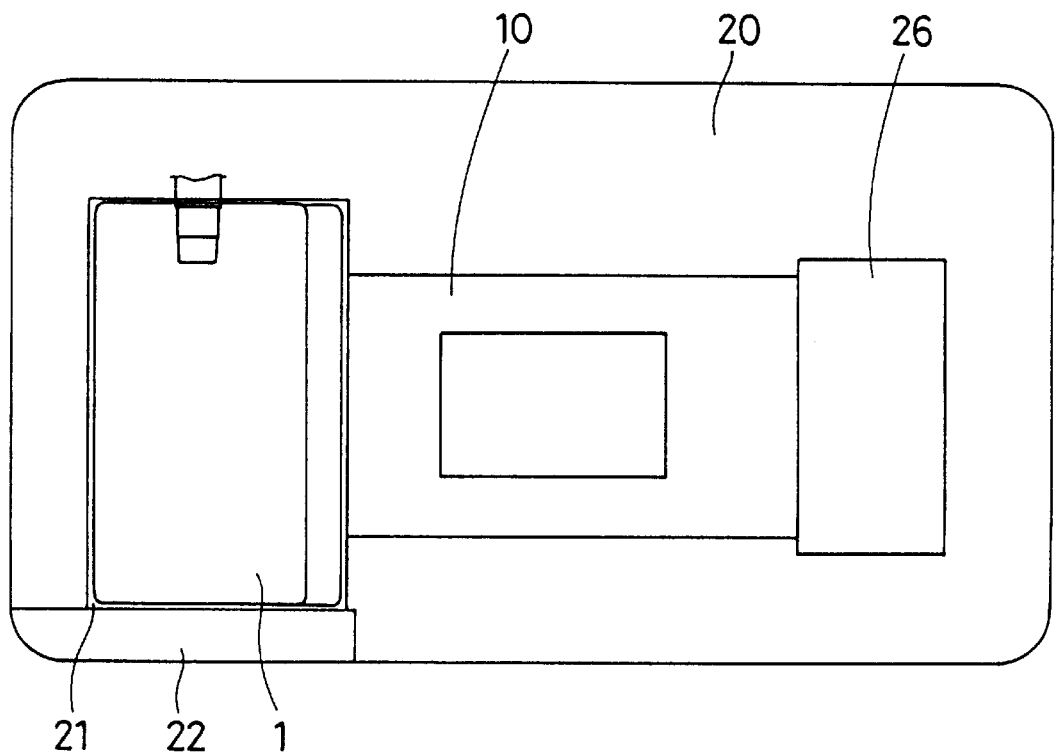
FIG. 3 is a front view briefly showing the structure of the camera.

A cartridge chamber lid 22 for insertion of the cartridge 1 is provided at the lower end of the cartridge chamber 21. A keyed spindle 31 engaged in a spool 3 of the cartridge 1 (see FIG. 1) and a spindle key 32 protruding from the keyed spindle 31 and engaged in the spool 3 together with the keyed spindle 31 are provided at the upper end. The keyed spindle 31 is fixed to a spindle gear (i.e. a gear having a spindle) 61 disposed above the cartridge chamber 21. The keyed spindle 31, the spindle key 32 and the spindle gear 61 are integrally rotatable about the same rotation axis as that of the spool 3.

The spindle key 32 is buried in the keyed spindle 31 when abutting on the cylindrical surface 3b inside the spool 3. When the spindle key 32 and a key groove 3a formed in the spool 3 coincide in phase, the spindle key 32 protrudes by the action of a non-illustrated compression spring imbedded in the keyed spindle 31 so as to be rotatable integrally with the spool 3. With this structure, the phases of the spool 3, the spindle key 32 and the spindle gear 61 are uniquely decided.

To the spindle gear 61, a cam 51 is coupled by a subsequently-described one-way clutch. When the spindle gear 61 rotates in the counterclockwise direction viewed from the upper surface of the camera, the spindle gear 61 and the cam 51 rotate integrally. When rotating in the clockwise direction, the spindle gear 61 rotates idly so that the position of the cam 51 is maintained. The spindle gear 61 and the cam 51 constitute a first driving mechanism 30 together with other members described later in detail. The driving force for driving the driving mechanism 30 is transmitted with a first sun gear 91 as the starting point. The first sun gear 91 is engaged with a first planet gear 101 and a second planet gear 81, and is driven by a motor 23 disposed in the spool 26 through a speed reducing mechanism 24, a transmitting mechanism 25 and a transmitting axis 33 disposed in parallel with the rotation axis of the spindle gear 61.

The driving force from the motor 23 is transmitted to a second sun gear 41 by way of the speed reducing mechanism 24. The second sun gear 41 is engaged with a third planet gear 43 to constitute a second driving mechanism 40. When necessary, the third planet gear 43 is engaged with a spool gear 27 rotating integrally with the winding spool 26 to rotate the winding spool 26.

The third planet gear 43 is held by a non-illustrated planet carrier having a through hole engaged with the central axis (not shown) of the second sun gear 41 serving as the revolution axis of the third planet gear 43. When the third planet gear 43 is rotated, an appropriate amount of frictional force is caused between the third planet gear 43 and the planet carrier by a non-illustrated compression spring sandwiched therebetween.

When the third planet gear 43 is engaged only with the second sun gear 41, the third planet gear 43 has its rotation limited by the frictional force and makes a sun-and-planet motion in the same direction as the rotation direction of the second sun gear 41. When the third planet gear 43 is engaged also with the spool gear 26 by the sun-and-planet motion, the third planet gear 43 has its sun-and-planet motion limited and rotates while maintaining the frictional force. Such an arrangement of a planet carrier and a planet gear where the rotation and the revolution (sun-and-planet motion) of the planet gear are controlled by the frictional force will hereinafter be referred to as frictional coupling.

When the motor 23 rotates in the normal direction (the film rewinding direction, details will be described later), the second sun gear 41 rotates in the direction of the arrow 41a and the third planet gear 43 revolves in the direction of the arrow 43a. The spool gear 27 and the third planet gear 43 do not engage with each other. When the motor 23 rotates in the reverse direction, the third planet gear 43 revolves in the direction of the arrow 43b, and the spool gear 27 and the third planet gear 43 engage with each other. The gears in the transmitting mechanism 25 are arranged so that the first sun gear 91 rotates in the direction of the arrow 91a when the motor 23 rotates in the normal direction.

Figure 6:
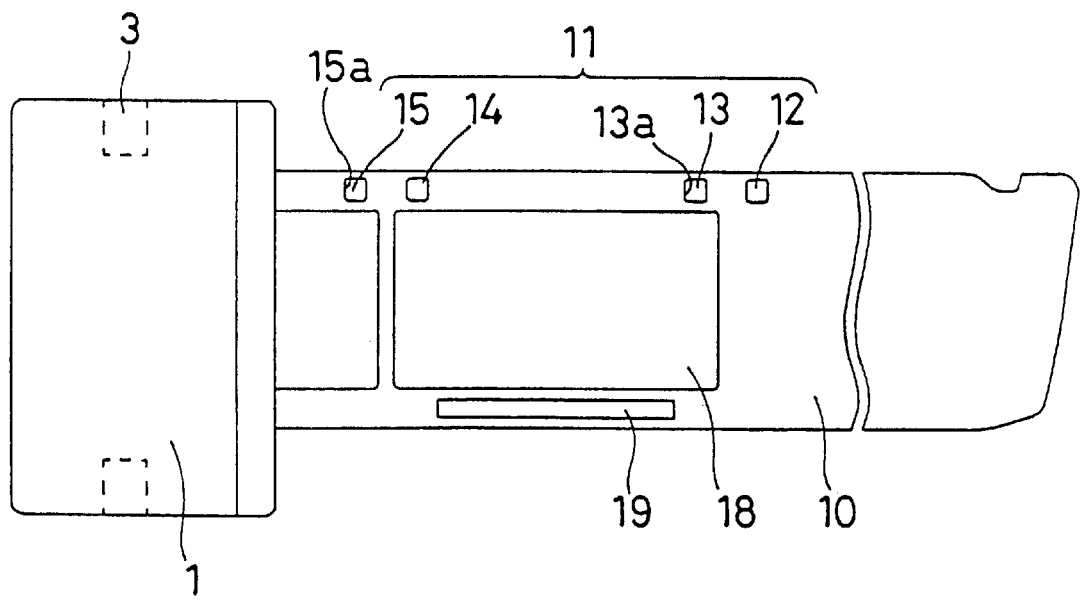
FIG. 6 is a front view showing the structure of a film.

In the center of the camera 20, an exposure portion 36, a first perforation sensor 16, a second perforation sensor 17, a magnetic head 34 and a pad 35 are disposed. To explain these members, the structure of the film 10 will be described. FIG. 6 shows a condition where the film 10 is drawn out of the cartridge 1. On the film 10, square perforations 11 are provided in the number in accordance with the number of exposures of the film 10 in such a manner that, assuming that an exposure region 18 is the first frame, a prediction perforation 12 for the first frame, a positioning perforation 13 for the first frame, a prediction perforation 14 for the second frame and a positioning perforation 15 for the second frame are provided above the exposure region 18. The perforations 11 are used for positioning of the film 10. In a lower part of the film 10, magnetic recording regions 19 as many as the number of exposures of the film 10 are formed for recording of information such as whether flash is used or not during photographing.

In FIGS. 5A and 5B, the magnetic head 34 is provided for recording information onto the magnetic recording regions 19 and the pad 35 is provided for pushing the film 10 against the magnetic head 34. The first and the second perforation sensors 16 and 17 are optical sensors The film 10 is positioned at a desired position by detecting the number of times light is transmitted and intercept when the perforations 11 move as the film 10 moves. The final positioning is decided when the cartridge 1 side edges 13a or 15a of the positioning perforations 13 or 15 intercept the light to the first perforation sensor 16, and the exposure portion 36 of the camera 20 is aligned with the exposure region 18 of the film 10. By using the second perforation sensor 17 and the prediction perforations 12 and 14, the perforations 11 can be used for purposes other than positioning such as switching of driving.

Figure 7:
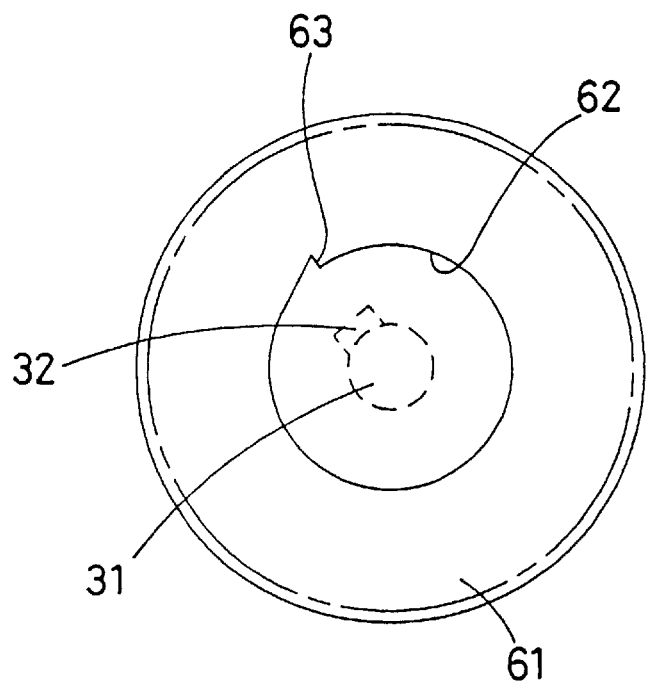
FIG. 7 is a plan view showing the structure of a spindle gear of the embodiment.
Figure 8:
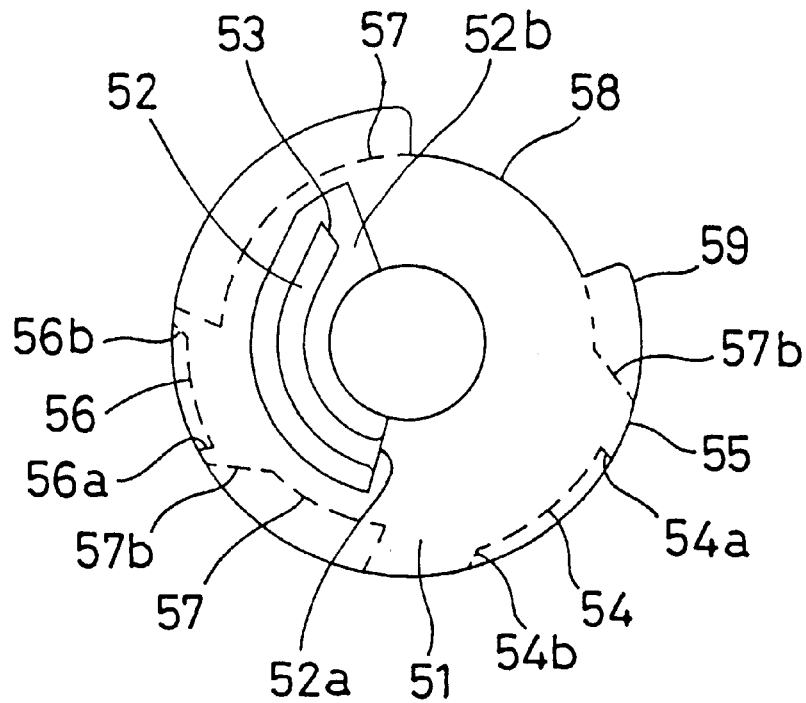
FIG. 8 is a plan view showing the structure of a cam of the embodiment.

Subsequently, details of the first driving mechanism will be described. FIGS. 7 and 8 show details of the spindle gear 61 and the cam 51. In FIG. 7, the keyed spindle 31 having the spindle key 32 protruding therefrom is fixed to the spindle gear 61, and the spindle gear 61 has in the center thereof a cylindrical surface 62 subsiding by an appropriate amount and a stopper surface 63 protruding from the cylindrical surface 62 by an appropriate amount toward the periphery.

In FIG. 8, the cam 51 has two-stage cam surfaces, namely, upper cam surfaces 58 and 59 (shown by the solid lines in the figure) and lower cam surfaces 54 to 57 (shown by the broken lies in the figure). The upper cam surfaces 58 and 59 have the concave cam surface 58 and the convex cam surface 59. The lower cam surfaces 54 to 57 have the shallow cam surfaces 54 and 56 and the deep cam surface 57. The shallow cam surfaces 54 and 56 have stopper surfaces 54a and 56a for controlling the rotation of the cam 51.

In a hole 52b of the cam 51, a plate spring 52 protruding from the lower surface of the cam 51 with a fulcrum 52a as the base end is formed along substantially the same circumference as that of the cylindrical surface 62 of the spindle gear 61 so as to be in the subsiding cylindrical surface 62. The free end has an engagement surface 53 engaged with the stopper surface 63 of the spindle gear 61.

Figure 10:
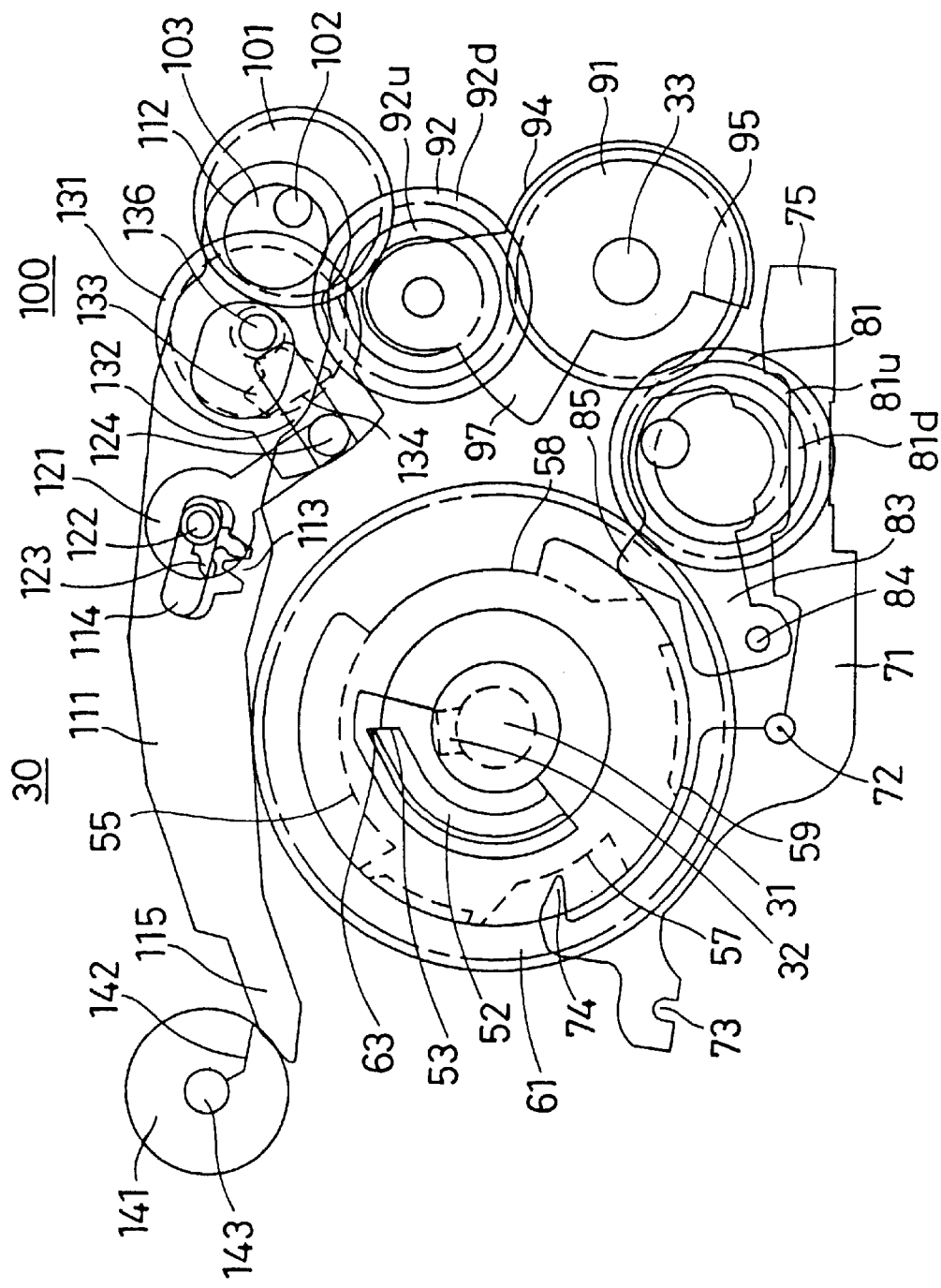
FIG. 10 shows a condition immediately after a film cartridge is loaded in a first driving mechanism of the embodiment.

Details of the first driving mechanism 30 having the cam 51 and the spindle gear 61 as main parts are shown in FIG. 10. FIG. 10 shows the positional relationship among the parts immediately after the subsequently-described cartridge 1 is loaded. In FIG. 10, the cam 51 is disposed above the spindle gear 61 so as to have the same rotation center. By the rotation of the spindle gear 61 in the counterclockwise direction of the figure, the engagement surface 53 of the plate spring 52 and the stopper surface 63 are engaged, so that the cam 51 is rotated in the counterclockwise direction By the rotation of the spindle gear 61 in the clockwise direction, the plate spring 52 slides on the inner wall of the cylindrical surface 62 while abutting thereon, so that the position of the cam 51 is substantially maintained. A first engagement portion 74 of a rewinding planet gear control lever 71 attached so as to be rotatable about a central axis (a fulcrum) 72 is engaged with the lower-stage cam surface 57 of the cam 51. A protrusion 85 of a thrust planet carrier 83 holding the second planet gear (hereinafter, referred to as thrust planet gear) 81 and being rotatable about the central axis 84 abuts on the upper-stage cam surface 59.

The rewinding planet gear control lever 71 receives force in the clockwise direction of the figure with the contral axis 72 as the center by a non-illustrated tension spring provided in a concave 73. The rewinding planet gear control lever 71 has the above-mentioned first engagement portion 74 at one end and has a second engagement portion 75 at the other end. The thrust planet gear 81 is formed to have two stages for speed reduction. A large-diameter planet gear 81u of the upper stage is always engaged with the first sun gear 91 and rotates by being driven by the motor 23. A small-diameter planet gear 81d of the lower stage drives the spindle gear 61 by engaging with the spindle gear 61 when the protrusion 85 of the thrust planet carrier 83 abuts on the concave cam surface 58. The thrust planet carrier 83 makes the above-mentioned frictional coupling with the thrust planet gear 81. When the first sun gear 91 rotates in the clockwise direction of the figure (direction of reverse rotation of the motor), the thrust planet gear 81 rotates about the central axis 84 in the counterclockwise direction, so that the protrusion 85 abuts on the cam surfaces 58 and 59. When the first sun gear 91 rotates in the counterclockwise direction (direction of normal rotation of the motor), the protrusion 85 is separated from the cam surfaces 58 and 59.

The first sun gear 91 is also engaged with a large-diameter planet gear 92d of the lower stage of the first planet gear (hereinafter, referred to as rewinding planet gear) 92 formed to have two stages for speed reduction. The rewinding planet gear 92 makes a sun-and-planet motion about the transmitting axis 33 for transmitting the driving force from the motor 23. A rewinding planet carrier 94 holding the rewinding planet gear 92 makes the frictional coupling with the rewinding planet gear 92. By the rotation of the first sun gear 91 in the counterclockwise direction (direction of normal rotation of the motor), the large-diameter planet gear 92d of the lower stage of the rewinding planet gear 92 is engaged with the spindle gear 61. By the rotation of the first sun gear 91 in the clockwise direction (direction of reverse rotation of the motor), a small-diameter planet gear 92u of the upper stage of the rewinding planet gear 92 is engaged with a light lock door (LLD) driving gear 101 for driving a light lock door opening and closing mechanism 100.

The light lock door opening and closing mechanism 100 opens and closes the light lock door 6 of the cartridge 1, and comprises the LLD driving gear 101, an LLD driving lever 111, an LLD driving converting lever 121 and an LLD driver 131. The LLD driving lever 111 has an elongate hole 114 and a rack 113 substantially in the center. The elongate hole 114 is a through hole. The rack 113 is dug down by an appropriate amount. The LLD driving lever 111 has at one end an engagement portion 115 and has at the other end a through hole 112 engaged with a decentering axis 103 of the LLD driving gear 101.

The LLD driving converting lever 121 has a gear 123 engaged with the rack 113, is placed so as to be rotatable about the central axis 122, and has a movement axis 124 at the end. The central axis 122 guides the elongate hole 114 of the LLD driving lever 111. The LLD driving lever 111 makes a crank motion about the central axis 102 with the central axis 122 as the fulcrum by the rotation of the LLD driving gear 101.

Figure 9:
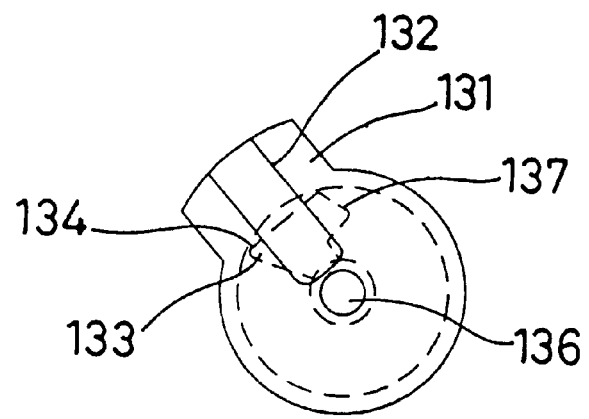
FIG. 9 is a plan view showing the structure of an LLD (light lock door) driver of the embodiment.

The LLD driver 131 (parts thereof are shown in FIG. 9) is placed so as to be rotatable about the central axis 136. In the LLD driver 131, a groove 132 in which the movement axis 124 is slidable is dug by an appropriate amount. An opening and closing key 133 is fixed or integrally formed downward so as to protrude in the cartridge chamber 21. The opening and closing key 133 has an unlocking surface 134 and an opening and closing surface 137. The opening and closing key 133 is engaged in the key hole 4 of the cartridge 1, so that the unlocking surface 134 pushes the locking portion 4a (see FIG. 1) to unlock the light lock door 6 and the opening and closing surface 137 rotates while engaging with the rotary portion 4b (see FIG. 1), thereby opening the light lock door 6.

In the vicinity of the engagement portion 115 of the LLD driving lever 111, an unlocking lever 141 is disposed for unlocking, by loading the cartridge 1 into the cartridge chamber 21, a locking mechanism (not shown) for locking the cartridge chamber lid 22. The unlocking lever 141 is rotatable about the central axis 143, receives force in the counterclockwise direction of the figure by a non-illustrated torsion spring, and has an engagement surface 142 engaged with the engagement portion 115 of the LLD driving lever 111.

Operations performed in the driving mechanism of the above-described structure will be described. FIG. 10 shows, as mentioned previously, a condition immediately after the cartridge 1 is loaded into the cartridge chamber 21 and the cartridge chamber lid 22 is closed. The loading of the cartridge 1 operates a non-illustrated locking mechanism to lock the cartridge chamber lid 22. In FIG. 10, since the protrusion 85 of the thrust planet carrier 83 abuts on the upper-stage cam surface 59, the spindle gear 61 and the thrust planet gear 81 are not engaged with each other and the first engagement portion 74 of the rewinding planet gear control lever 71 abuts on the deep cam surface 57 of the lower stage.

The rewinding planet gear 92 is engaged with the LLD driving gear 101. The LLD driving lever 111 is placed so that the central axis 122 of the LLD driving converting lever 121 is situated at the right end of the elongate hole 114. The movement axis 124 of the LLD driving converting lever 121 and the opening and closing key 133 are situated on the side closer to the rewinding planet gear 92. The opening and closing key 133 is engaged in the key hole 4 of the cartridge 1. The unlocking surface 134 pushes away the locking portion 4a of the key hole 4 toward the periphery of the key hole 4 to thereby unlock the light lock door 6.

Figure 11:
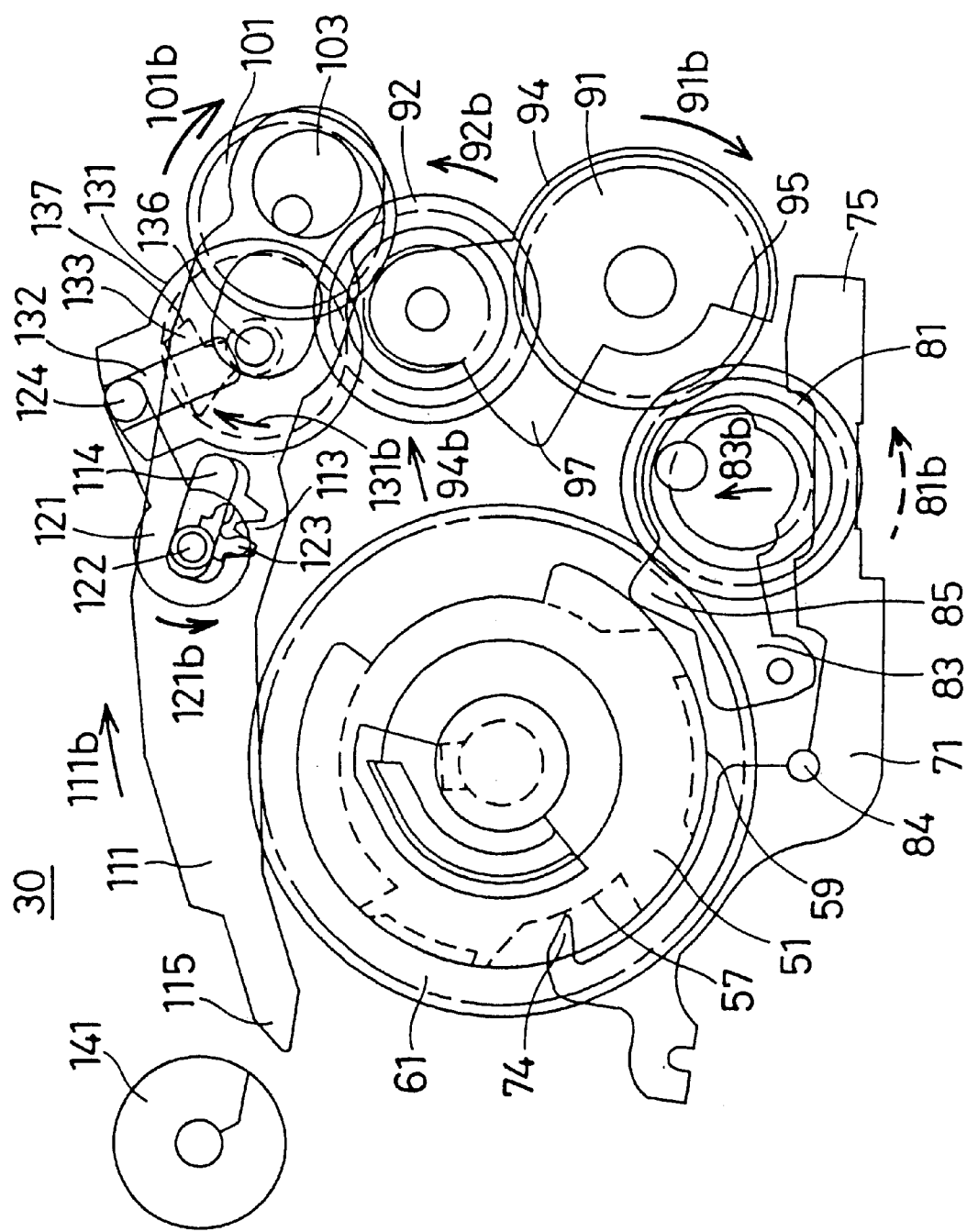
FIG. 11 is a plan view showing a condition where a light lock door is opened in the first driving mechanism of the embodiment.

Then, as shown in FIG. 11, a driving to open the light lock door 6 is performed. In FIG. 11, when the motor 23 is rotated in the reverse direction, the first sun gear 91 rotates in the direction of the arrow 91b (see FIG. 5B), so that the rewinding planet carrier 94 and the rewinding planet gear 92 receive force in the direction of the arrow 94b because of the frictional coupling and the rewinding planet gear 92 and the LLD driving gear 101 rotate in the directions of the arrows 92b and 101b, respectively. By the rotation of the LLD driving gear 101, the decentering axis 103 rotates about the central axis 102 in a direction such that the decentering axis 103 moves away from the LLD driver 131, and the LLD driving lever 111 moves in the direction of the arrow 111b.

By the driving force from the rack 113 to the gear 123 caused by the movement of the rack 113 and the elongate hole 114 that move together with the LLD driving lever 111, the LLD driving converting lever 121 is rotated about the central axis 122 in the direction of the arrow 121b. With this rotation, the movement axis 124 of the LLD driving converting lever 121 rotates the LLD driver 131 and the opening and closing key 133 about the central axis 136 in the direction of the arrow 131b while moving in the groove 132 of the LLD driver 131 first toward the rotation axis 136 of the LLD driver 131 and then toward the periphery.

By the rotation of the opening and closing key 133, the opening and closing surface 137 is rotated while pushing the rotary portion 4b of the cartridge 1, so that the light lock door 6 is opened. Then, the motor 23 is stopped by a non-illustrated detecting mechanism for detecting that the light lock door 6 is opened. At this time, the decentering axis 103 of the LLD driving gear 101 is situated in a position farthest away from the LLD driving converting lever 121. Although the thrust planet gear 81 attempts to engage with the spindle gear 61 by receiving force in the direction of the arrow 83b, it fails to achieve engagement because the protrusion 85 of the carrier 83 abuts on the convex cam surface 59. As a result, the thrust planet gear 81 becomes unrelated to the driving system. While the spool gear 27 and the spool 26 are rotating in the film winding-up direction because the motor 23 is rotating in the reverse direction, the rotation of the spool gear 27 and the spool 26 is unrelated to the driving system because the film 10 has not been drawn out from the cartridge 1 yet.

Figure 12:
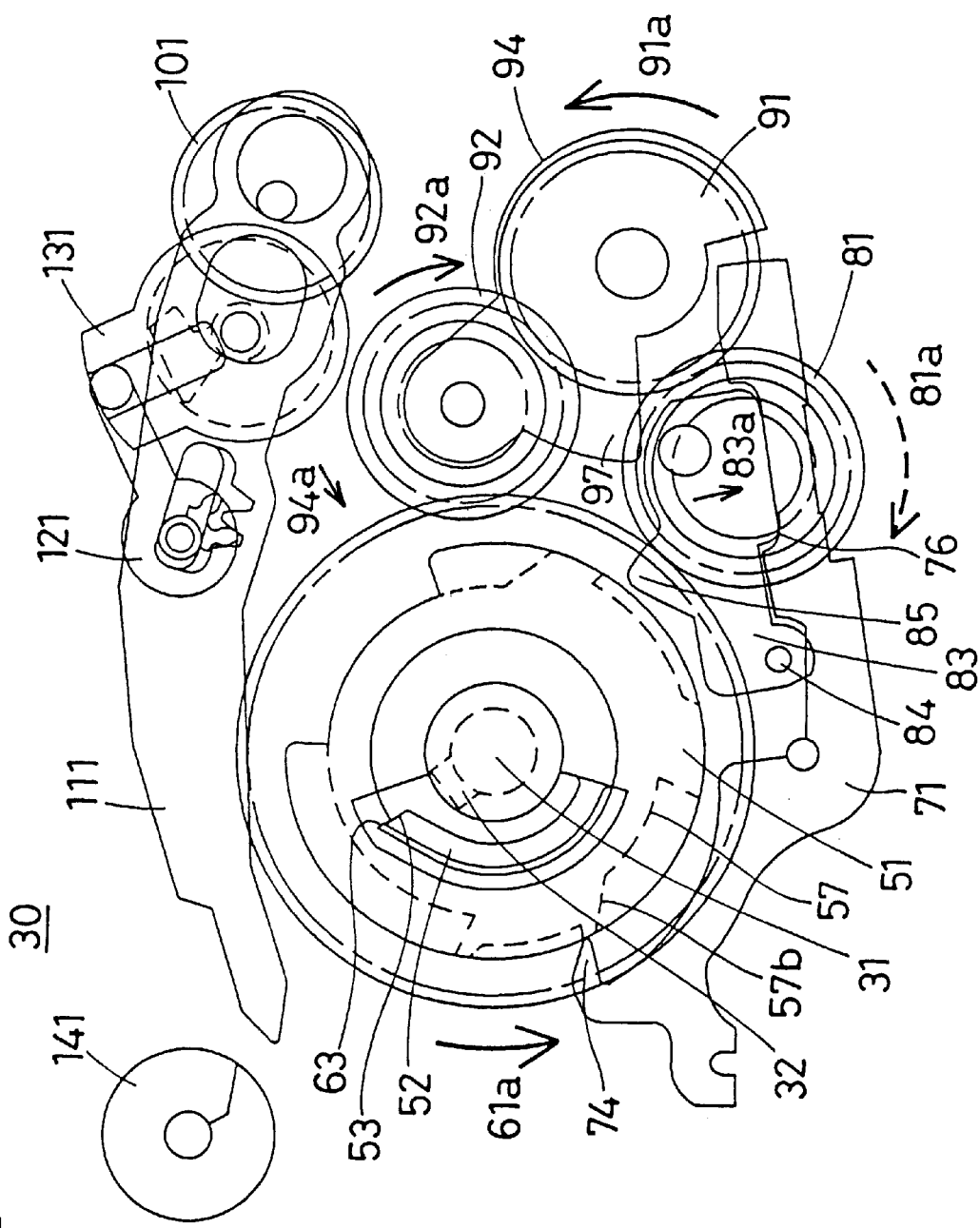
FIG. 12 is a plan view showing a condition at the time of rewinding in the first driving mechanism of the embodiment.

Then, as shown in FIG. 12, reading of film information on the data disk 2 and detection of the film use condition are performed by the rewinding driving. In FIG. 12, when the motor 23 is rotated in the normal direction, the first sun gear 91 rotates in the direction of the arrow 91a, the rewinding planet carrier 94 rotates in the direction of the arrow 94a, and the thrust planet carrier 83 receives force in the direction of the arrow 83a. The thrust planet gear 81 is controlled so as not to be disengaged from the first sun gear 91 by an abutting portion 76 of the rewinding planet gear control lever 71 abutting on the thrust planet carrier 83, and is controlled so as not to engage with the spindle gear 61 by a protrusion 97 of the rewinding planet carrier 94 abutting on the thrust planet carrier 83.

The rewinding planet carrier 94 causes the rewinding planet gear 92 and the spindle gear 61 to engage with each other, and by the rotation of the rewinding planet gear 92 in the direction of the arrow 92a, the spindle gear 61 and the spool 3 in the cartridge 1 are rotated in the direction of the arrow 61a (the film rewinding direction) to perform rewinding driving. By the rewinding operation, the data on the data disk 2 and the position of the data disk 2 are read out by a non-illustrated bar code sensor.

By the engagement surface 53 of the plate spring 52 being engaged with the stopper surface 63 of the spindle gear 61, the cam 51 is rotated integrally with the spindle gear 61 while the first engagement portion 74 of the rewinding planet gear control lever 71 is slidingly abutting on the lower-stage cam surface 57. The lower-stage cam surfaces 54, 55, 56 and 57 (see FIG. 8) have inclined surfaces 54b, 56b and 57b so that the rotation of the first engagement portion 74 of the rewinding planet gear control lever 71 in the direction of the arrow 61a is not hindered.

The first driving mechanism 30 has a non-illustrated mechanism for detecting the position of the spindle key 32. The center line of the spindle key 32 passing the rotation center of the keyed spindle 31 and the center of the spindle key 32 along the width is situated in an "unused" section 151, an "exposed partway" section 152, a "fully exposed" section 153 or a "developed" section 154 shown in FIG. 20 to thereby set the indicator 8 of the cartridge 1 at any of the marks 7 ("unused" 7a, "exposed partway" 7b, "fully exposed" 7c and "developed" 7d) to make the VEI setting. Hereinafter, the position of the center line of the spindle key 32 will be referred to as the position of the spindle key 32.

Figure 20:
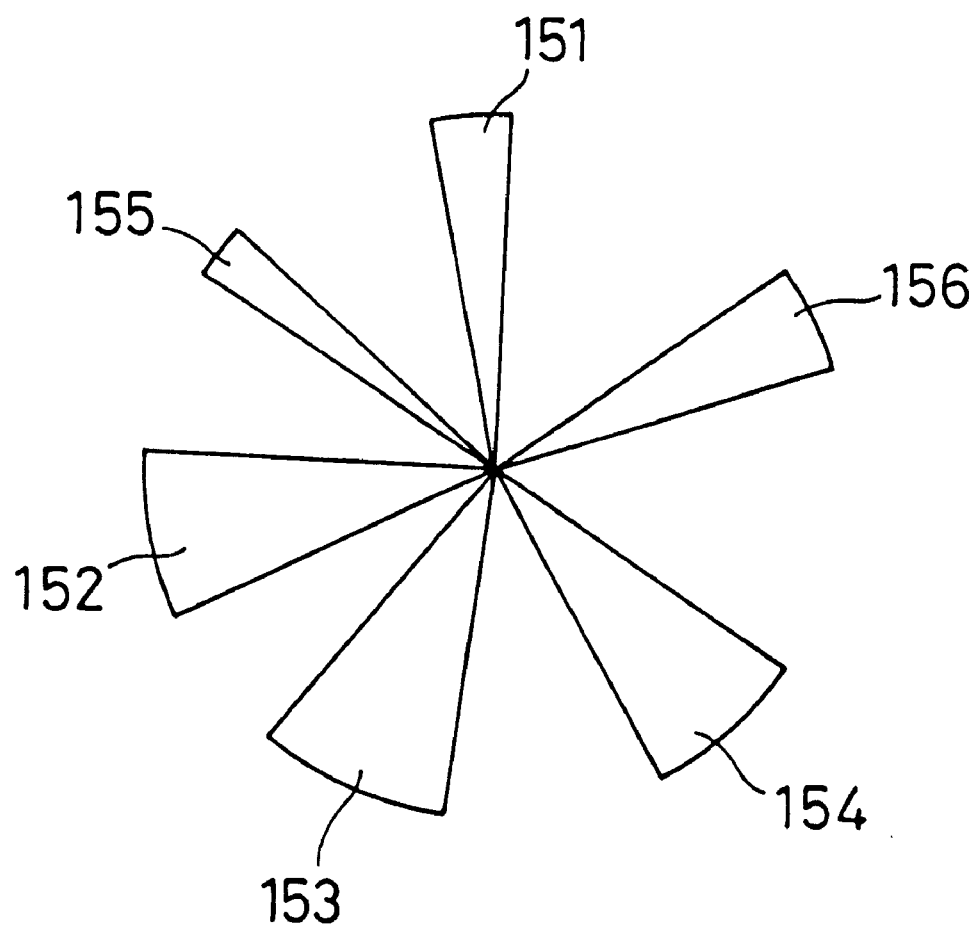
FIG. 20 is a schematic view showing operations for stop sections of the spindle key in the first embodiment of the present invention.

In this embodiment, subsequently-described winding-up driving and thrust driving are performed by situating the spindle key 32 at the positions of a winding-up section 155 and a thrust section 156 in addition of the above-mentioned positions of the VEI setting. In this embodiment, the above-mentioned center line of the spindle key 32 coincides with the stopper surface 63 of the spindle gear 61, and when the spindle gear is rotating in the direction of the arrow 61a, the center line coincides with the engagement surface 53 of the cam 51 whose position is uniquely decided. Therefore, the sections in FIG. 20 represent the position of the engagement surface 53 of the cam 51 as well as the position of the spindle key 32. Hereinafter, the position of the engagement surface 53 of the cam 51 will be referred to as the position of the cam 51.

When the film use condition of the loaded cartridge 1 is different from the film use condition of the cartridge 1 taken out last time, the position of the spindle key 32 according to the VEI setting and the position of the key groove 3a of the loaded cartridge 1 disaccord with each other. In such a case, the spindle key 32 is engaged in the spool 3 while being imbedded in the keyed spindle 31 by being pushed by the inner wall of the spool 3 of the cartridge 1, and when the position of the spindle key 32 and the phase of the key groove 3a in the spool 3 coincide with each other by the rotation of the spindle gear 61, the spindle key 32 protrudes from the keyed spindle 31 by a compression spring provided in the keyed spindle 31 to thereby integrally rotate the spindle gear 61 and the spool 3.

Figure 13:
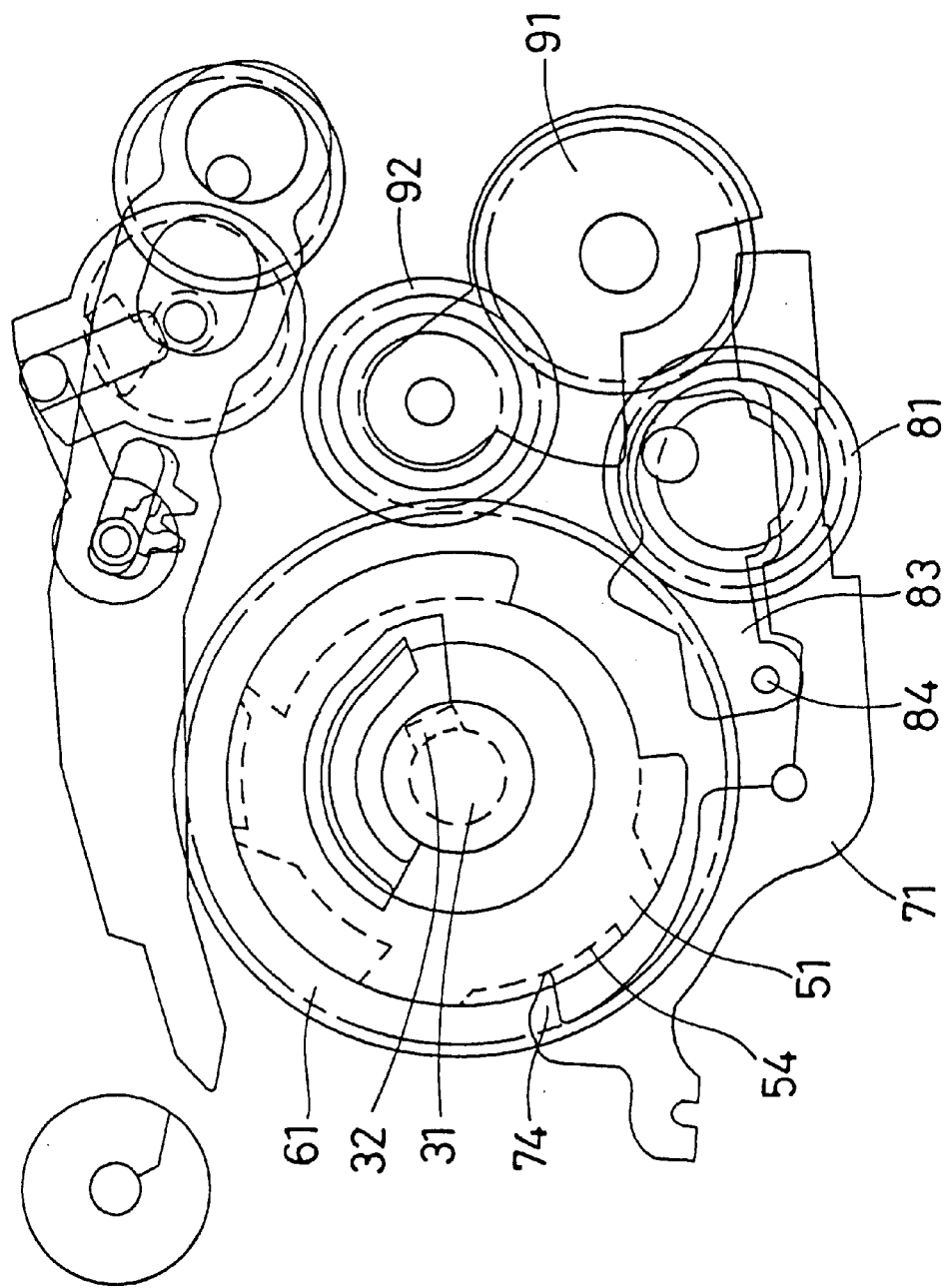
FIG. 13 is a plan view showing a condition where a spindle key is stopped in a thrust section in the first driving mechanism of the embodiment.

As a result of the detection of the position of the data disk 2 or the spindle key 32, when the film use condition is "fully exposed" or "developed", a subsequently-described operation to unlock the cartridge chamber lid 22 is performed, and when the film use condition is "unused" or "exposed partway", the motor 23 is stopped when the spindle key 31 is in the thrust section 156 (see FIG. 20) as shown in FIG. 13. At this time, the first engagement portion 74 of the rewinding planet gear control lever 71 abuts on the shallow cam surface 54 of the lower stage.

Figure 14:
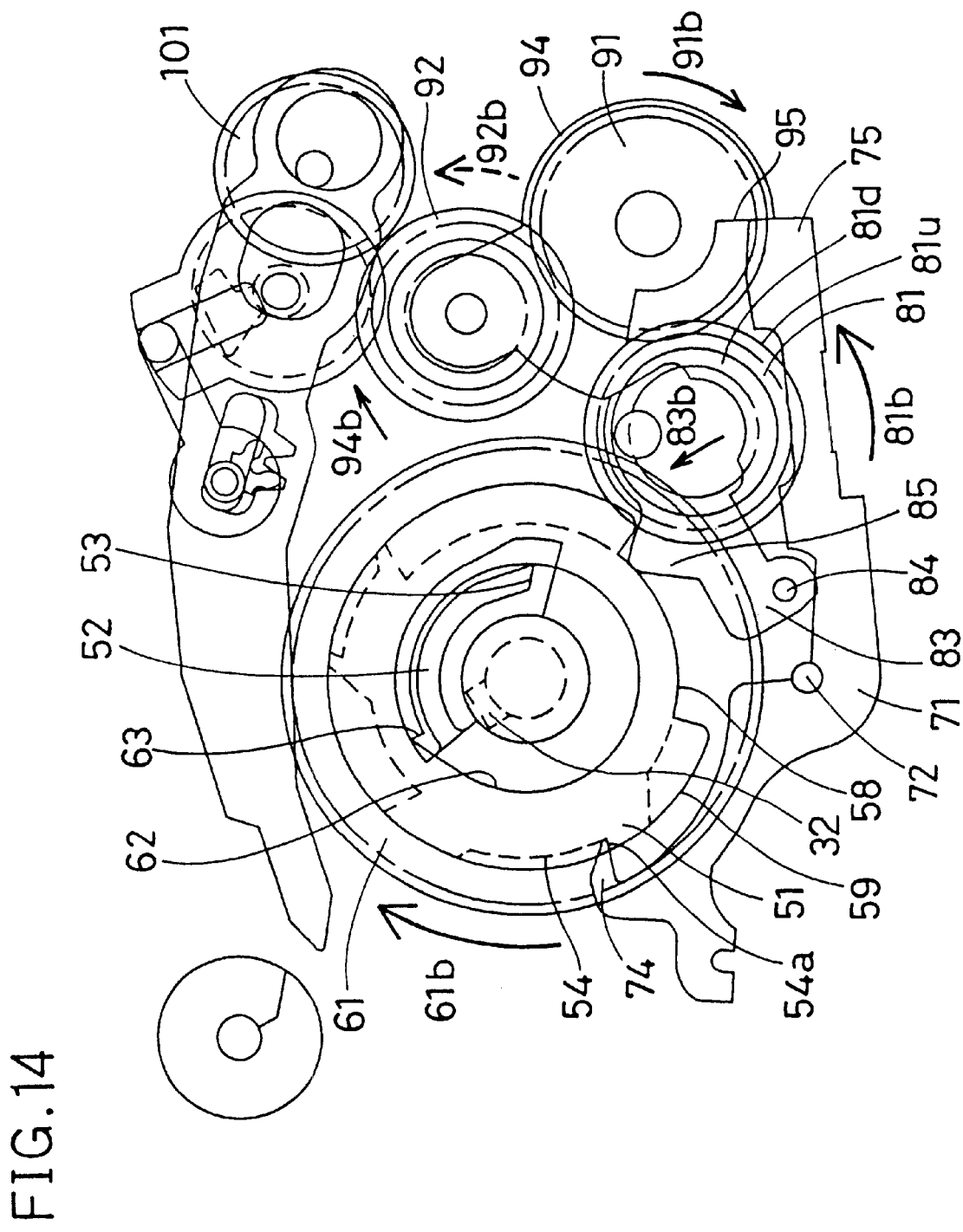
FIG. 14 is a plan view showing a condition of thrust driving in the first driving mechanism of the embodiment.

Then, thrust driving is performed. When the motor 23 is rotated in the reverse direction, the winding spool 26 to which the driving force from the motor 23 is transmitted by way of the second sun gear 41 and the third planet gear 43 rotates in the winding-up direction of the film 10 (see FIG. 5B). In FIG. 14, the first sun gear 91 rotates in the direction of the arrow 91*b*, and the rewinding planet carrier 94 and the thrust planet carrier 83 rotate in the directions of the arrows 94*b* and 83*b*, respectively.

Since the first engagement portion 74 of the rewinding planet gear control lever 71 is at the shallow cam surface 54 of the lower stage, the second engagement portion 75 of the rewinding planet gear control lever 71 approaches the first sun gear 91 with the central axis 72 as the fulcrum, and engages with an engagement surface 95 of the rewinding planet carrier 94 to thereby limit the movement of the rewinding planet carrier 94, so that the rewinding planet gear 92 is prevented from engaging with the LLD driving gear 101. When the position of the cam 51 is in the thrust section 156, since the protrusion 85 of the thrust planet carrier 83 abuts on the concave cam surface 58 of the upper stage, the thrust planet gear 81 is engageable with the spindle gear 61, so that the spindle gear 61 is rotated in the direction of the arrow 61*b*.

When the rotation direction of the spindle gear 61 is the direction of the arrow 61*b*, since the stopper surface 63 of the spindle gear 61 and the engagement surface 53 of the cam 51 do not engage with each other, the cam 51 does not rotate integrally with the spindle gear 61. However, rotational force is supplied to the cam 51 by the frictional force caused because of the abutment of the plate spring 52 on the cylindrical surface 62 of the spindle gear 61. The rotational force is canceled by the first engagement portion 74 of the rewinding planet gear control lever 71 being engaged with the stopper surface 54*a* of the cam 51, so that the position of the cam 51 is maintained. Consequently, the rotation of the spindle gear 81 in the direction of the arrow 61*b* is maintained, so that the film 10 is sent out.

Since the cam surface of the lower stage of the cam 51, i.e. that surface which faces the thrust planet carrier 85, is the deep cam surface 57 in this case, the thrust planet gear 81 is situated so that the spindle gear 61 and the small-diameter planet gear 81*d* of the lower stage are engaged with each other and that the large-diameter planet gear 81*u* of the upper stage gets in under the portion constituting the convex cam surface 59 of the upper stage. Consequently, since the deep can surface 57 of the lower stage also serves as the recess for preventing the large-diameter planet gear 81*u* of the upper stage and the cam 51 from abutting on each other, it is unnecessary to form a separate recess on the cam 51. Therefore, the axial thickness of the cam 51 is reduced and the efficiency in space is excellent.

Then, by sensing the prediction perforation 12 of the first frame (see FIG. 6) by the second perforation sensor 17 (see FIG. 5A), it is detected that the tip of the film 10 is caught by the winding spool 26 and the motor 23 is stopped. The detection that tho tip of the film 10 is caught by the winding spool 26 may be performed by another method. For example, the winding spool 26 and a member (not shown) for pushing the film 10 against the winding spool 26 are made of a conductive material and electric current is passed therebetween. The detection can be made by the electric current being intercepted by the film 10 getting in between the spool 26 and the member.

Figure 15:
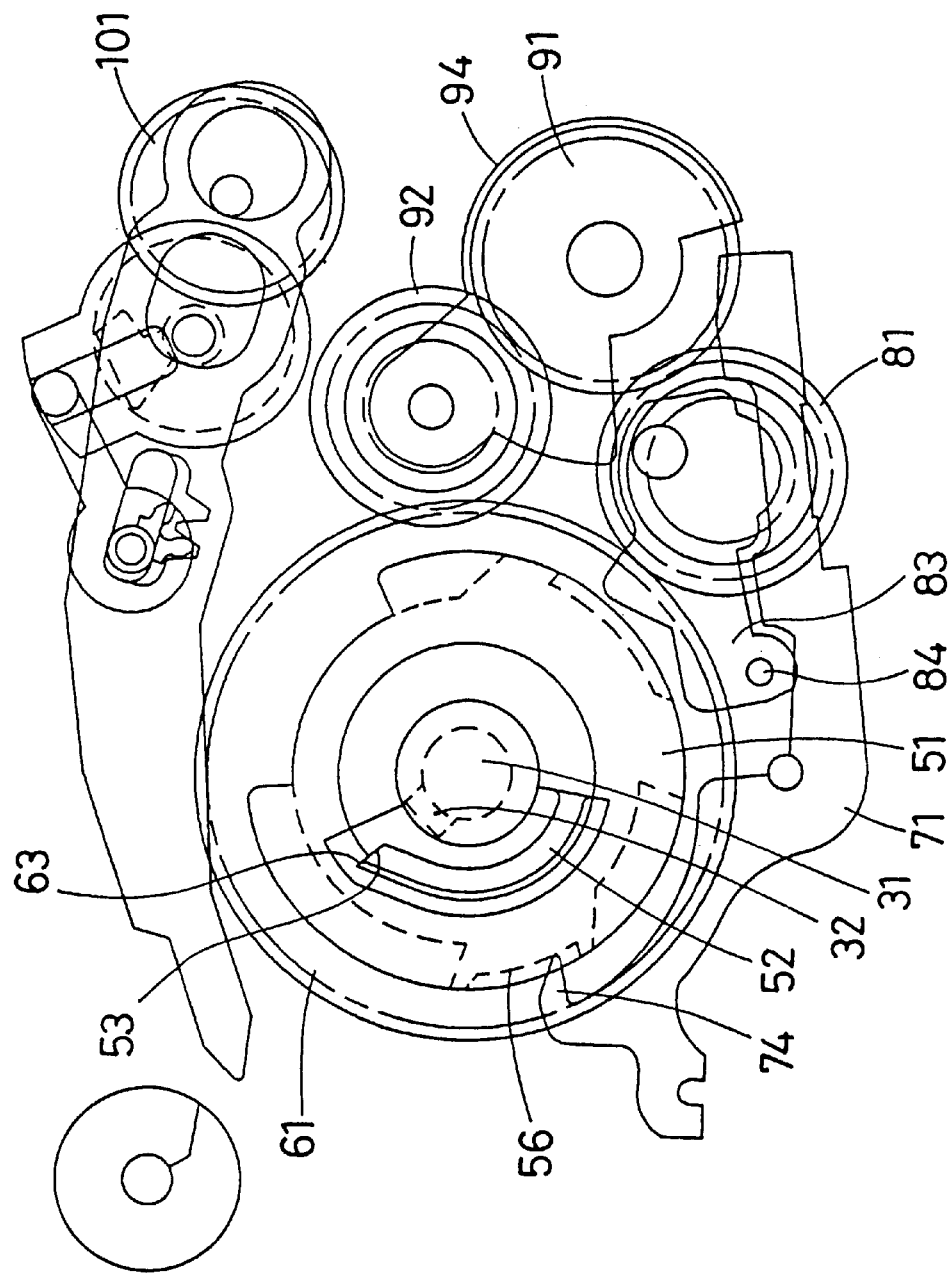
FIG. 15 is a plan view showing a condition where the spindle key is stopped in a winding-up section in the first driving mechanism of the first embodiment of the present invention.

Then, the previously-described rewinding driving is performed (see FIG. 12), and as shown in FIG. 15, the positions of the spindle key 32 and the cam 51 move from the thrust section 156 to the winding-up section 155 and stop there. At this time, the first engagement portion 74 of the rewinding planet gear control lever 71 abuts on the shallow cam surface 56 of the lower stage. By the rewinding driving, the spool 3 makes one rotation (approximately 120 degrees in this embodiment) at the maximum to rewind the film 10, so that the positional shift of the film 10 is large. When the shift hinders succeeding operations, adjustment can be made by delaying the stop period of the above-described thrust driving.

Figure 16:
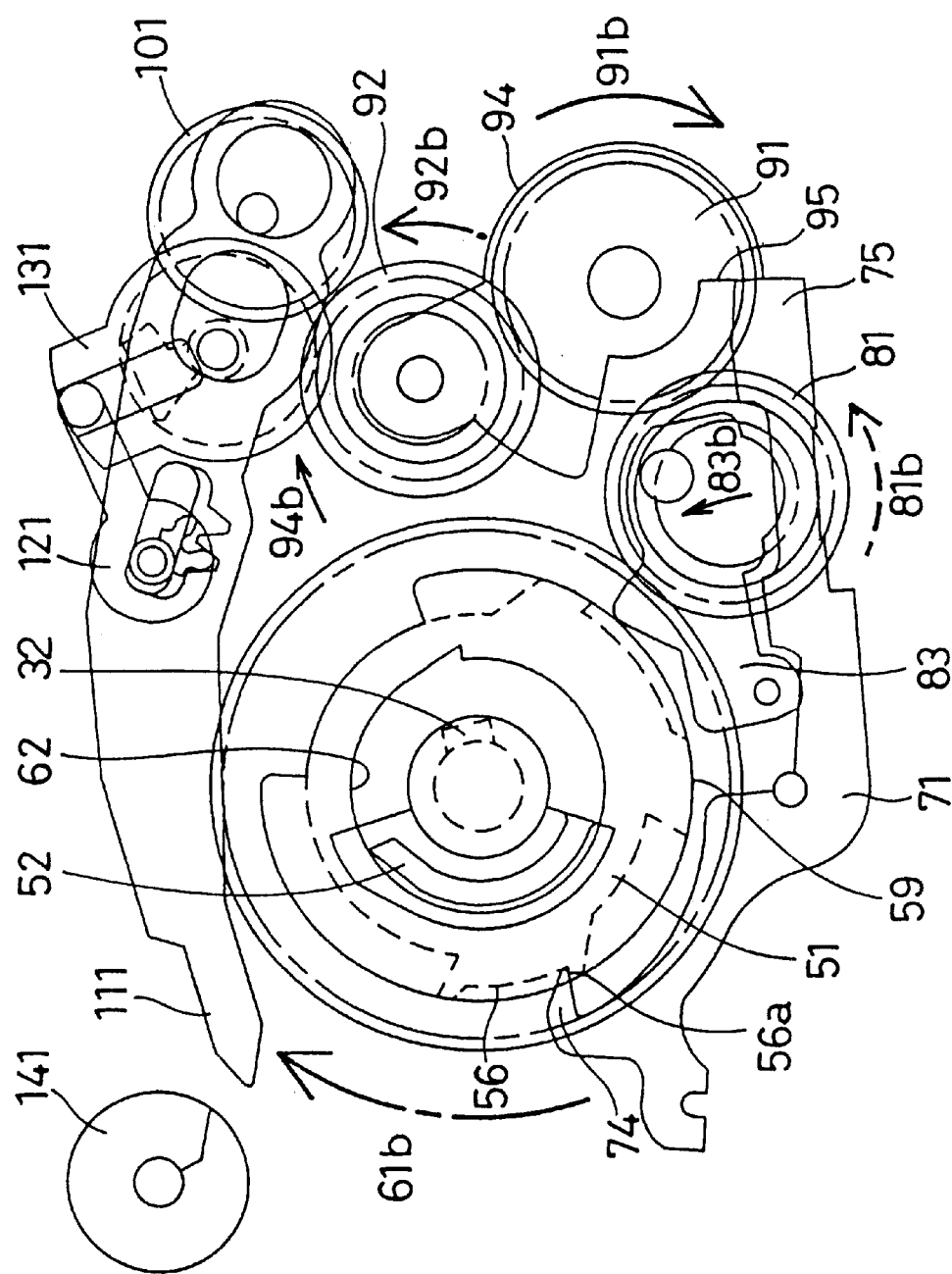
FIG. 16 is a plan view showing a condition of winding-up driving in the first driving mechanism of the first embodiment of the present invention.

Then, winding-up driving is performed. When the motor 23 is rotated in the reverse direction, the winding spool 26 rotates in the winding-up direction of the film 10 like in the thrust driving (see FIG. 5B). In FIG. 16, the first sun gear 91 rotates in the direction of the arrow 91*b*, and the rewinding planet carrier 94 and the thrust planet carrier 83 receive force in the directions of the arrows 94*b* and 83*b*, respectively.

Since the first engagement portion 74 of the rewinding planet gear control lever 71 is at the shallow cam surface 56 of the lower stage, the second engagement portion 75 of the rewinding planet gear control lever 71*a* approaches the first sun gear 91 with the central axis 72*a* s the fulcrum, and engages with the engagement surface 95 of the rewinding planet carrier 94 to thereby limit the movement of the rewinding planet carrier 94, so that the rewinding planet gear 92 is prevented from engaging with the LLD driving gear 101.

Since the position of the cam 51 is in the winding-up section 155, the protrusion 85 of the thrust planet carrier 83 abuts on the convex cam surface 59 of the upper stage, so that the thrust planet gear 81 is prevented from engaging with the spindle gear 61. Since no driving force from the first driving mechanism 30 is transmitted to the spindle gear 61, the spindle gear 61 is rotated in the direction of the arrow 61*b* by being pulled by the film 10 by the rotation of the spool 26 in the winding-up direction.

Then, when the film use condition is "unused", the edge 13*a* of the positioning perforation 13 for the first frame of the film 10 (see FIG. 6) is sensed by the first perforation sensor 16 (see FIG. 1), and by stopping the motor 23, a predetermined position of the film 10 is set at the exposure portion 36 of the camera 20. When the film use condition is "exposed partway", the edge of the positioning perforation corresponding to the first unexposed frame of the film 10 is sensed by the first perforation sensor 16 and the motor 23 is stopped.

This completes the initial loading. Then, a user's operation such as photographing or forcible rewinding is waited for.

When the user performs photographing, after the shutter is released by a non-illustrated shutter releasing mechanism, the previously-described winding-up driving (see FIG. 16) is performed and a predetermined position of the next frame of the film 10 is set at the exposure portion 36 of the camera 20. Then, the user's next operation is waited for.

Figure 17:
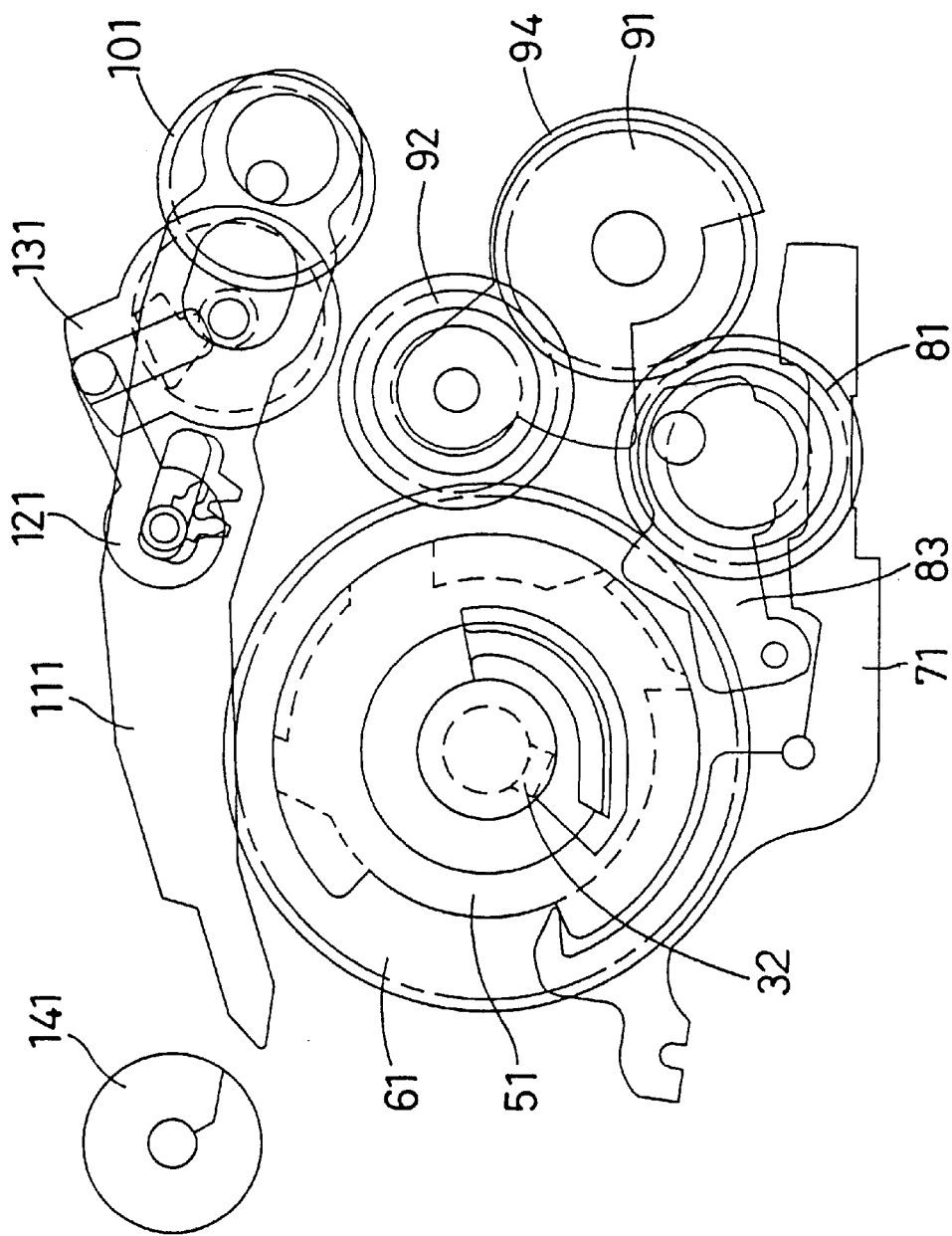
FIG. 17 is a plan view showing a condition where the spindle key is stopped in a "fully exposed" section in the first driving mechanism of the embodiment.

When the last frame of the film 10 is exposed or when the user turns on a non-illustrated rewinding switch, as shown in the previously-described FIG. 12, the motor 23 rotates in the normal direction to perform rewinding driving, it is sensed by a non-illustrated sensor that the whole of the film 10 is housed in the cartridge 1, the VEI setting is made, and then, the motor 23 is stopped. The VEI setting is made based on the positions of the spindle key 32 and the cam 51. FIG. 17 shows a condition where the positions of the spindle key 32 and the cam 51 are stopped in the "fully exposed" section 153.

Figure 18:
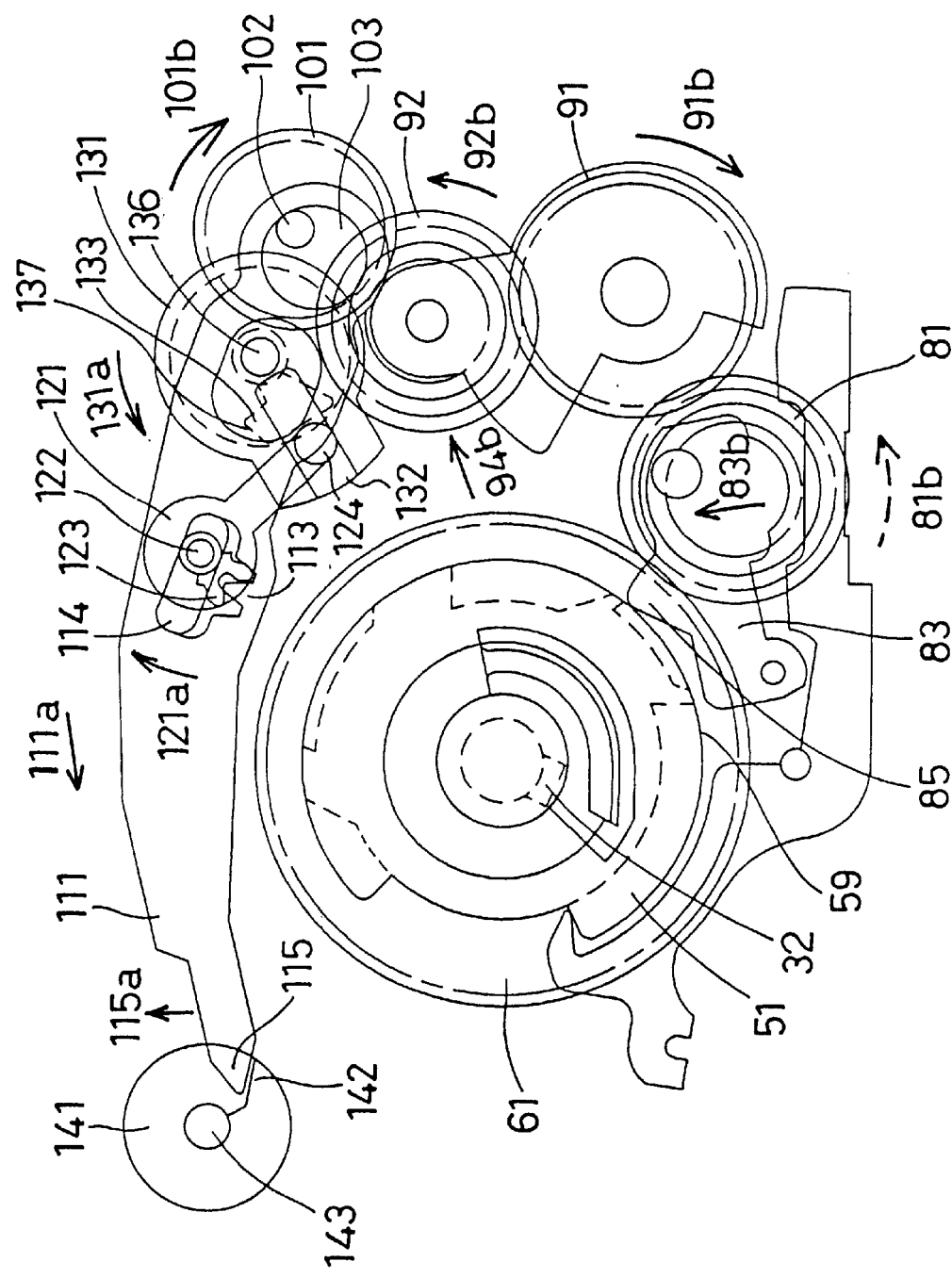
FIG. 18 is a plan view showing a condition before the light lock door is closed and a cartridge lid unlocking mechanism is unlocked in the first driving mechanism of the embodiment.
Figure 19:
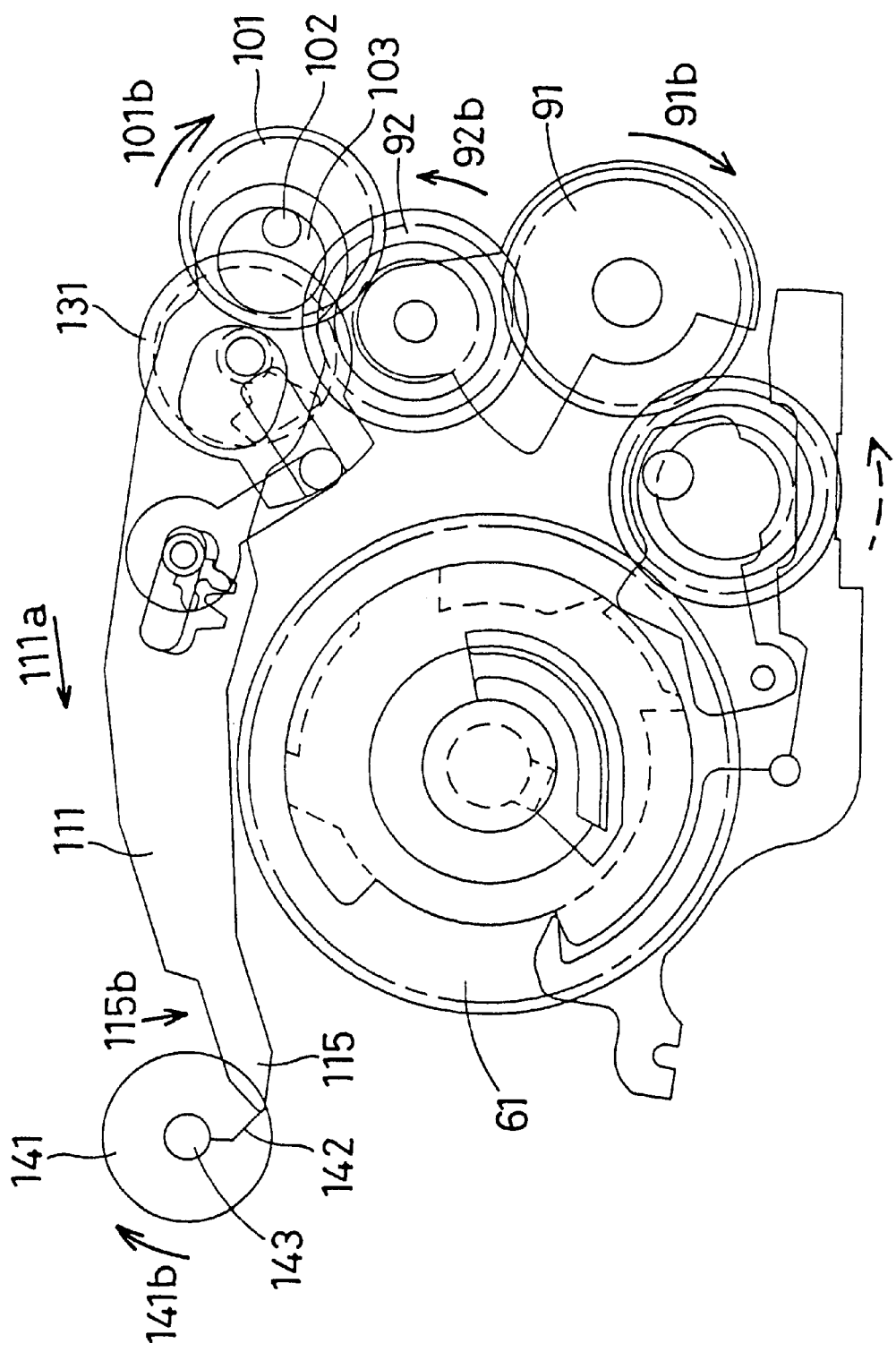
FIG. 19 is a plan view showing a condition immediately after the cartridge lid locking mechanism is unlocked in the first driving mechanism of the embodiment.

Driving to close the light lock door 6 and driving of the unlocking lever 141 as shown in FIGS. 18 and 19 are automatically performed when the whole of the film 10 is housed in the cartridge 1. These drivings are also performed when a non-illustrated unlocking switch of the cartridge chamber lid 22 is turned on by the user who performed rewinding. In FIG. 18, the motor 23 rotates in the reverse direction, and the first sun gear 91, the thrust planet gear 81 and the rewinding planet gear 92 rotate in the directions of the arrows 91b, 81b and 92b, respectively.

The thrust planet carrier 83 and the rewinding planet carrier 94 receive force in the directions of the arrows 83b and 94b, respectively, and the rewinding planet gear 92 and the LLD driving gear 101 are engaged with each other, so that the LLD driving gear 101 rotates in the direction of the arrow 101b. Since the position of the cam 51 is at the VEI setting position as mentioned above, the protrusion 85 of the thrust planet carrier 83 abuts on the convex cam surface 59 of the upper stage, and the thrust planet gear 81 and the spindle gear 61 are not engaged with each other, so that the driving of the spindle gear 61 is cut off.

By the rotation of the LLD driving gear 101 in the direction of the arrow 101b, the decentering axis 103 rotates about the central axis 102 in a direction such that the decentering axis 103 approaches the LLD driver 131, so that the LLD driving lever 111 moves in the direction of the arrow 111a. By the driving force from the rack 113 to the gear 123 caused by the movement of the rack 113 and the elongate hole 114 which move together with the LLD driving lever 111, the LLD driving converting lever 121 is rotated about the central axis 122 in the direction of the arrow 121b. With this rotation, the movement axis 124 of the LLD driving converting lever 121 rotates the LLD driver 131 and the opening and closing key 133 about the central axis 136 in the direction of the arrow 131a while moving in the groove 132 of the LLD driver 131 first toward the rotation axis 136 and then toward the periphery.

By the rotation of the opening and closing key 133, the rotary portion 4b of the cartridge 1 is rotated while pushing the opening and closing surface 137 of the opening and closing key 133 by a non-illustrated spring provided in the cartridge 1, so that the light lock door 6 is closed.

At this time, the decentering axis 103 of the LLD driving gear 101 once moves in the downward direction of the figure while rotating in the direction of the arrow 101b. Since the LLD driving lever 111 makes a crank motion with the central axis 122 of the LLD driving converting lever 121 as the fulcrum, the downward movement of the decentering axis 103 causes the engagement portion 115 of the LLD driving lever 111 to move upward (arrow 115a). Consequently, the engagement portion 115 of the LLD driving lever 111 moves in the directions of the arrows 111a and 115a and, as shown in the figure, can be situated above the engagement surface 142 of the unlocking lever 141.

When the LLD driving gear 101 is further rotated from the condition shown in FIG. 18, as shown in FIG. 19, the decentering axis 103 of the LLD driving gear 101 moves upward in the figure while rotating in the direction of the arrow 101b, so that the engagement portion 115 of the LLD driving lever LLD moves in the direction of the arrow 115b and is engaged with the engagement surface 142 of the unlocking lever 141 to rotate the unlocking lever 141 about the central axis 143 in the direction of the arrow 141b. Consequently, the cartridge chamber lid 22 is unlocked and the motor 23 is stopped by a non-illustrated detecting mechanism for sensing the unlocking.

These operations enable the user to open the cartridge chamber lid 22 and the cartridge 1 is taken out FIG. 19 shows a condition immediately before the engagement portion 115 of the LLD driving lever 111 and the engagement surface 142 of the unlocking lever 141 are disengaged. The engagement portion 115 and the engagement surface 142 are disengaged immediately after this condition, and the unlocking lever 141 is returned to its original position by a non-illustrated torsion spring. At this time, the decentering axis 103 of the LLD driving gear 101 is in a position closest to the LLD driver 131 and is set in a condition for waiting for the cartridge 1 to be taken out.

Figure 4:
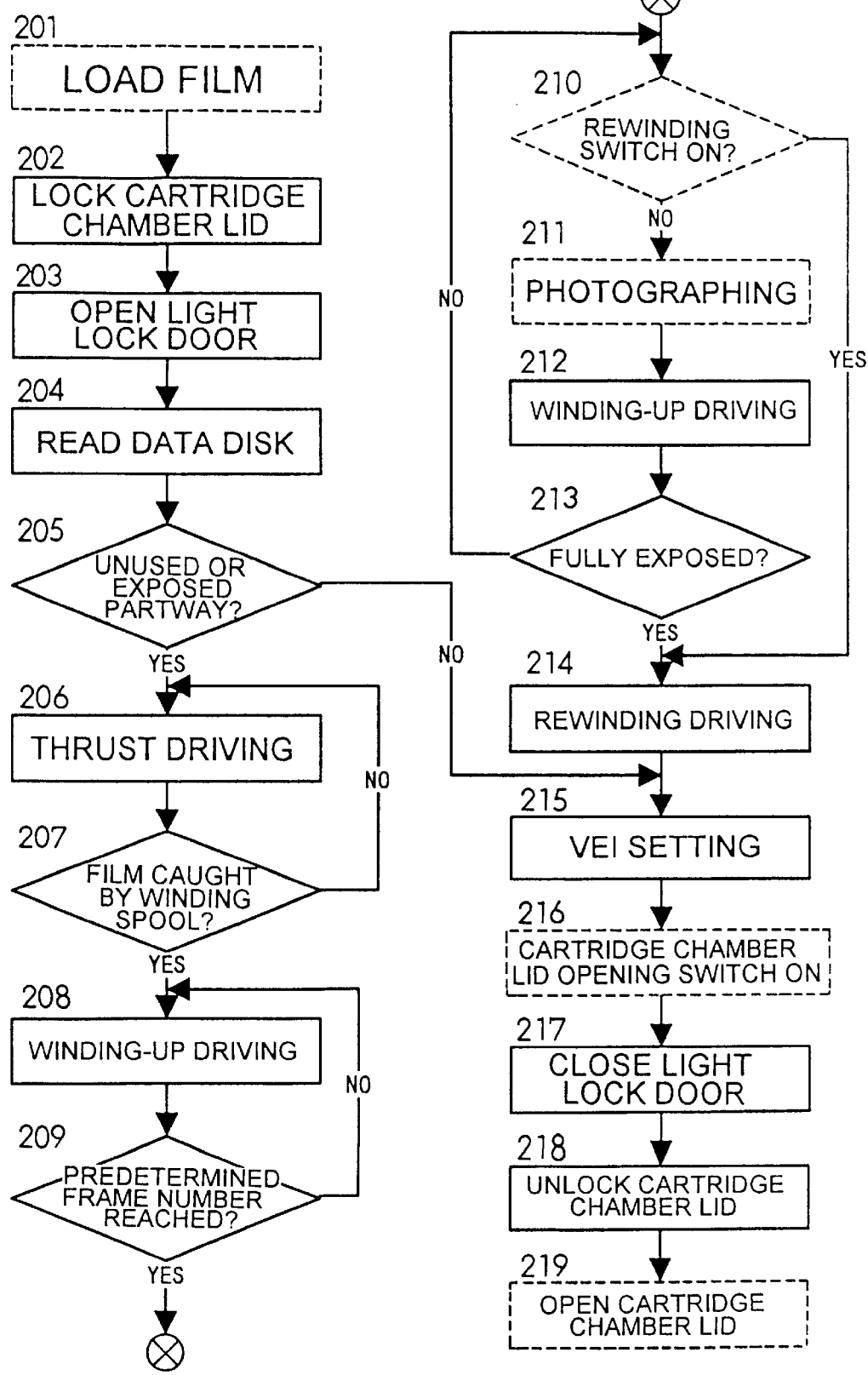
FIG. 4 is a flowchart showing the operations necessary for the camera.

Table 1 provides a summary of the conditions of the first driving mechanism 30 in the operations shown in FIGS. 10 to 19 and conditions of the second driving mechanism 40. Here, the first sun gear 91, the second sun gear 41, the thrust planet gear 81, the rewinding planet gear 92 and the third planet gear 43 are always rotating while the motor 23 is rotating. In Table 1, the operations have the same operation numbers as those shown in the flowchart (see FIG. 4) showing the example of the operations necessary for the camera.

FIGS. 21A and 21B show the structure of the gears in the first embodiment of the present invention in comparison with those of the conventional example. FIG. 21A shows the engagement relationship among the gears shown in the previously-described Japanese Laid-open Patent Application No. H9-211590. FIG. 21B shows the engagement relationship among the gears of the first embodiment of the present invention. M represents the motor. F represents the spindle gear. L represents the LLD driving gear. S represents the spool gear. C represents a cam gear. Reference numerals 161a to 161d represent sun gears. Reference numerals 162a to 162g represent planet gears. Reference numerals 163a to 163d represent driving force transmitting mechanisms. Reference numeral 171 represents one side of the camera where the cartridge chamber is disposed. Reference numeral 172 represents the other side of the camera where the spool is disposed.

According to this, in the first embodiment of the present invention, the cam gear and one planet gears are deleted compared with the conventional example. Since the parts are disposed so as to be distributed on both sides of the camera, the influence of the driving mechanism having a larger volume is greater in reducing the size of the camera. Viewing only the cartridge chamber side having a larger volume, the cam gear, one sun gear and two planet gears are deleted.

In the above-described first embodiment, when the position of the cam 51 is situated in the winding-up section, the thrust planet gear 81 and the rewinding planet gear 92 are disengaged from the spindle gear 61, and by the rotation of the spool gear 27 by the reverse rotation of a motor 21, winding-up driving is performed. However, since the rotation direction of the spindle gear is the same during thrust driving and during winding-up driving, winding-up driving can be performed with the position of the cam 51 being maintained in the thrust section 156 like in a subsequently described second embodiment.

Figure 22A:
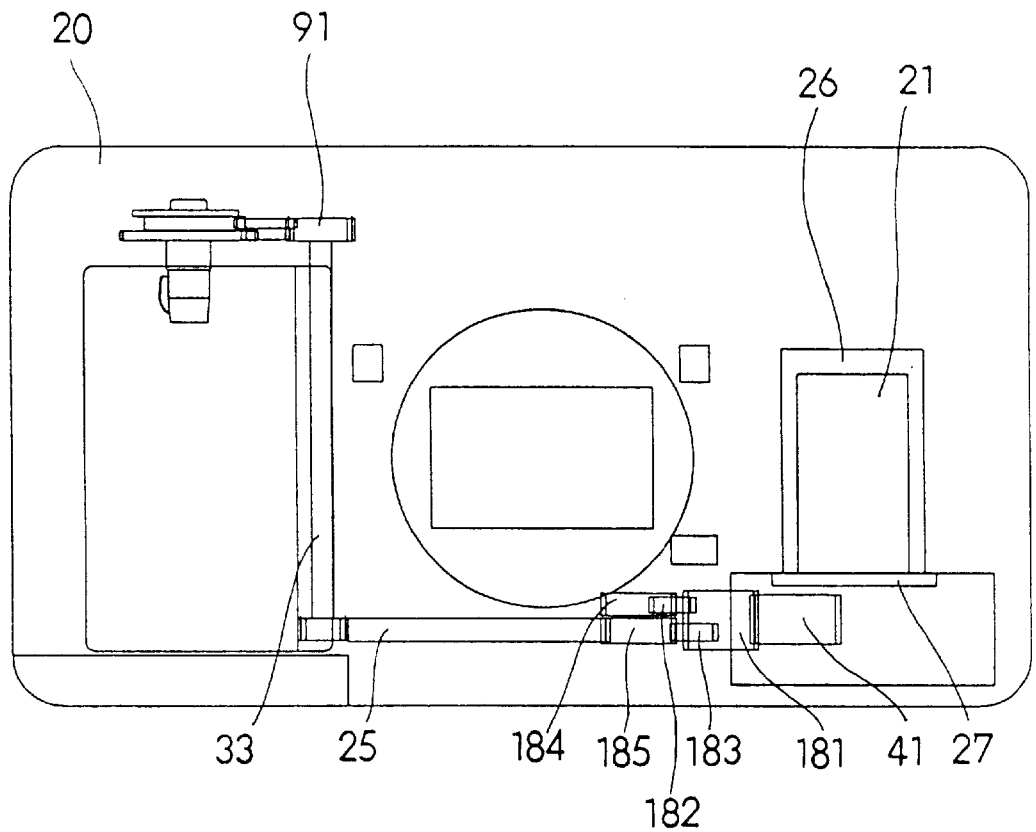
FIG. 22A is a front view showing the structure of a camera according to a second embodiment of the present invention.
Figure 22B:
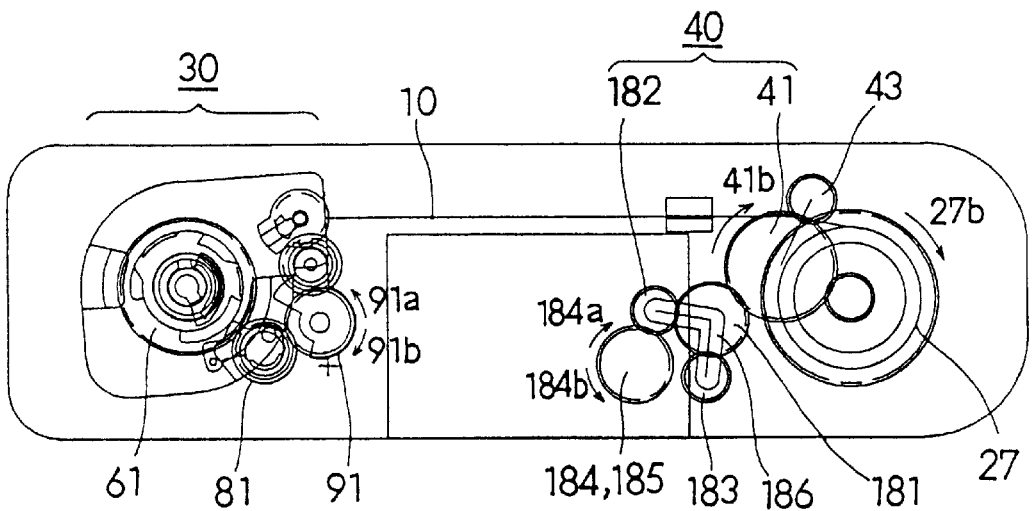
FIG. 22B is an upper view showing the structure of the camera according to the second embodiment of the present invention.

FIG. 22A is a front view showing a camera according to the second embodiment of the present invention. FIG. 22B is an upper view thereof. In these figures, a third sun gear 181 is engaged with the second sun gear 41, and a fourth planet gear 182 and a fifth planet gear 183 with the distance from the third sun gear 181 maintained by a planet carrier 186 is engaged with the third sun gear 181. The fourth and the fifth planet gears 182 and 183 make a frictional coupling with the planet carrier 186.

First and second clutch gears 184 and 185 coupled to the driving transmitting mechanism 25 are disposed in positions where the gears 184 and 185 are engageable with the fourth and the fifth planet gears 182 and 183. When the motor 21 rotates in the normal direction, the fifth planet gear 183 makes a sun-and-planet motion to be engaged with the second clutch gear 185. When the motor 21 rotates in the reverse direction, the fourth planet gear 182 makes a sun-and-planet motion to be engaged with the first clutch gear 184.

The first clutch gear 184 and the second clutch gear 185 have the same rotation center. One of them has a non-illustrated plate spring like the cam 51 and the other thereof has a non-illustrated stopper surface like the spindle gear 61 to constitute a one-way clutch mechanism for transmitting unidirectional rotation like the cam 51 and the spindle gear 51. The first clutch gear 184 rotates the second clutch gear 185 in the direction of the arrow 184*b* of the figure (direction of reverse rotation of the motor) when rotating in the direction of the arrow 184*b*. However, when the second clutch gear 185 rotates in the direction of the arrow 184*b*, the rotation is not transmitted to the first clutch gear 184.

In the second driving mechanism 40 of this structure, when the motor 21 rotates in the normal direction, the rotation of the second sun gear 41 separates the third planet gear 43 from the spool gear 27 and rotates the third sun gear 181. The rotation of the third sun gear 181 separates the fourth planet gear 182 from the first clutch gear 184, engages the fifth planet gear 183 with the second clutch gear 185, and rotates the first sun gear 91 in the direction of the arrow 91*a* through the driving transmitting portion 25. At this time, although the rotation of the second clutch gear 185 in the direction of the arrow 184*a* is transmitted to the first clutch gear 184, the first clutch gear 184 and the fourth planet gear 182 are unrelated to the driving system because they are separated.

A driving force is thus transmitted to the first driving mechanism 30, and by the rotation of the first sun gear 91 in the direction of the arrow 91*a* caused by the rotation of the motor 21 in the normal direction, the previously-described rewinding driving is performed.

Then, when the motor 21 is rotated in the reverse direction with the aforementioned position of the cam 51 being in the thrust section 155, the second sun gear 41 rotates in the direction of the arrow 41*b* and the third planet gear 43 rotates to be engaged with the spool gear 27 to rotate the spool gear 27 in the film winding-up direction (arrow 27*b*).

The third sun gear 181 engages the fourth planet gear 182 with the first clutch gear 184 and rotates the first clutch gear 184 in the direction of the arrow 184*b*. With this rotation, the second clutch gear 185 is rotated in the direction of the arrow 184*b* and the first sun gear 91 is rotated in the direction of the arrow 91*b* through the driving transmitting portion 25 to perform the previously-described thrust driving.

When the winding spool 26 catches the film 10 during thrust driving, the winding spool 26 performs rewinding. At this time, rotation is transmitted in the order of the spindle gear 61, the thrust planet gear 81, the first sun gear 91 and the driving transmitting portion 25 by the film 10 pulled by the winding spool 26, so that the second clutch gear 185 is rotated in the direction of the arrow 184*b*. On the other hand, the second clutch gear 185 is rotated by the rotation of the first clutch gear 184 in the direction of the arrow 184*b* transmitted by way of the second sun gear 41, the third sun gear 181 and the fourth planet gear 182.

Thus, to the overall driving mechanism, driving force is simultaneously transmitted through two paths. When rotating in the direction of the arrow 184*b*, the second clutch gear 185 can rotate at a higher speed than the first clutch gear 184 by the second clutch gear 185 and the first clutch gear 184 being disengaged from each other by the above-described clutch mechanism. The difference in driving force between the two paths can be absorbed by considering speed reduction during driving force transmission to the spindle gear 61 so that the speed at which the spindle gear 61 pushes out the film 10 is sufficiently lower than the speed at which the winding spool 26 winds the film 10. Consequently, winding-up driving with the position of the cam 51 being in the thrust section 155 is enabled.

When thrust driving and winding-up driving are simultaneously performed, since the film 10 rewinding radius of the spool 3 in the cartridge 1 and the winding spool 26 varies according to the amount by which the film 10 has been wound up, the speed at which the spindle gear 61 pushes out the film 10 gradually decreases, and the speed at which the winding spool 26 winds up the film 10 gradually increases. A very complicated mechanism is necessary for synchronizing the speeds associated with the spindle gear 61 and the winding spool 26 (spool gear 27) according to the winding-up condition of the film 10 in order to prevent the film 10 from becoming loose in the camera 20. However, according to this embodiment, it is unnecessary to sychronize the speeds, so that the mechanism for simultaneously performing thrust driving and winding-up driving can be simplified. Moreover, according to this structure, although the number of parts constituting the driving mechanism increase no means is necessary for sensing whether the film 10 is caught by the winding spool 26 or not and the driving control method can be simplified.

Table 2 provides a summary of the operation conditions of the first driving mechanism 30 and the second driving mechanism 40 in the second embodiment. In the table, the operation number 207 is unnecessary (see FIG. 4).

Obviously, many modifications and variations of the present invention are possible in light of the above teachings. It is therefore to be understood that within the scope of the appended claims, the invention may be practiced other than as specifically described.

TABLE 1

| Operation No. | Operation | Rotation Direction of Motor 23 | Rotation Direction of Spindle Gear 61 | Gear Meshed with Spindle Gear 61 | LLD Driving Gear 101 | Position of Cam 51 | Spool Gear 27 |
|---|---|---|---|---|---|---|---|
| 203 | Open the light lock door 6 | Reverse | | | Rotating | VEI setting position | Rotating (no film) |
| 204–205 | Read the data disk 2 | Forward | Counter-clockwise | Rewinding planet gear 92 | | Rotating | |
| | Stop | | | | | Thrust section | |
| 206–207 | Drive the film 10 in the thrust direction | Reverse | Clockwise | Thrust planet gear 81 | | Thrust section | Rotating (no film) |
| 208–209 | Move the cam 51 | Forward | Counter-clockwise | Rewinding planet gear 92 | | Rotating | |
| | Stop | | | | | Winding-up section | section |
| | Wind up the film 10 | Reverse | Clockwise | None | | Winding-up section | Rotating |
| 212 | Wind up the film 10 | Reverse | Clockwise | None | | Winding-up section | Rotating |
| 214–215 | Rewind the film 10 | Forward | Counter-clockwise | Rewinding planet gear 92 | | Rotating | |
| | Set VEI and then stop | | | | | VEI setting position | |
| 217–218 | Close the light lock door 6 and unlock | Reverse | | | Rotating | VEI setting position | Rotating (no film) |

TABLE 1

| Operation No. | Operation | Rotation Direction of Motor 23 | Rotation Direction of Spindle Gear 61 | Gear Meshed with Spindle Gear 61 | LLD Driving Gear 101 | Position of Cam 51 | Spool Gear 27 |
|---|---|---|---|---|---|---|---|
| 203 | Open the light lock door 6 | Reverse | | | Rotating | VEI setting position | Rotating (no film) |
| 204–205 | Read the data disk 2 | Forward | Counter-clockwise | Rewinding plant gear 92 | | Rotating | |
| | Stop | | | | | Thrust section | |
| 206 | Drive the film 10 in the thrust direction | Reverse | Clockwise | Thrust planet gear 81 | | Thrust section | Rotating (no film) |
| 208–209 | Wind up the film 10 | Reverse | Clockwise | Thrust planet gear 81 | | Thrust section | Rotating |
| 212 | Wind up the film 10 | Reverse | Clockwise | Thrust planet gear 81 | | Thrust section | Rotating |
| 214–215 | Rewind the film 10 | Forward | Counter-clockwise | Rewinding planet gear 92 | | Rotating | |
| | Set VEI and then stop | | | | | VEI setting position | |
| 217–218 | Close the light lock door 8 and unlock | Reverse | | | Rotating | VEI setting position | Rotating (no film) |

What is claimed is:

1. A camera comprising:
   at least one motor;
   a spindle gear which is a gear having a spindle for rewinding and thrusting a film;
   a cam that rotates together with the spindle gear when the spindle gear is rotated in a film-rewinding direction and that remains at rest when the spindle gear is rotated in a film-thrusting direction;
   a direction-limiting mechanism for permitting the spindle gear to rotate in the film-rewinding direction only when the motor is rotating in a forward direction; and
   a transmission mechanism that comes into contact with the cam when the motor is rotating in a reverse direction such that, when the cam is in one of a plurality of predetermined rotation positions, a driving force of the motor is transmitted to one of a plurality of force transmission destinations to be driven thereby, wherein one of the plurality of transmission destinations is provided for each one of the predetermined rotation positions, respectively;
   wherein transmission of the driving force of the motor is switched by first rotating the spindle gear in the film-rewinding direction to bring the cam into one of the predetermined rotation positions and then reversing a rotation direction of the motor.

2. A camera as claimed in claim 1,
   wherein there are two of the predetermined rotation positions, of which a first is a position in which the driving force is transmitted to thrust the film and a second is a position in which the driving force is transmitted to wind up the film.

3. A camera as claimed in claim 1,
   wherein there are two of the predetermined rotation positions, of which a first is a position in which the driving force is transmitted to thrust the film and a second is a position in which the driving force is transmitted to open and close a light-lock door.

4. A camera as claimed in claim 1, wherein there are three of the predetermined rotation positions, of which a first is a position in which the driving force is transmitted to thrust the film, a second is a position in which the driving force is transmitted to wind up the film, and a third is a position in which the driving force is transmitted to open and close a light lock door.

5. A camera as claimed in claim 4, wherein there are two or more of the third predetermined rotation positions.

6. A camera as claimed in claim 1, wherein the transmission mechanism includes a planet gear that is constantly kept engaged with a sun gear and is movable.

7. The camera of claim 1, wherein the spindle gear rotates in a like direction during thrust driving and during wind-up driving.

8. A camera comprising:

at least one motor disposed inside the camera;

a driving-force transmission unit for transmitting a driving force of the motor;

a film cartridge chamber disposed in a side portion of the camera and having an opening through which a film cartridge is loaded and unloaded;

a first sun gear that receives the driving force of the motor from the driving-force transmission unit and that is disposed above the film cartridge chamber;

a spindle gear which is a gear having a spindle to which the driving force of the motor is selectively transmitted by rotation of the first sun gear;

a keyed spindle fixed on the spindle gear so as to rotate together therewith and so as to protrude therefrom into the film cartridge chamber to be fitted into a spool of the film cartridge;

a spindle key formed on the keyed spindle so as to be fitted into a key groove formed in the spool to make the spool rotate together with the keyed spindle;

a cam that rotates together with the spindle gear when the spindle gear is rotated in a direction in which a film is rewound back into the film cartridge and that remains at rest when the spindle gear is rotated in a direction in which the film is thrust out of the film cartridge;

a light-lock door driving gear to which the driving force of the motor is selectively transmitted by rotation of the first sun gear;

a light-lock door driving mechanism for opening and closing a light-lock door of the film cartridge by using rotation of the light-lock door driving gear;

a film winder disposed in an opposite side portion of the camera;

a second sun gear disposed near the film winder;

a spool gear to which rotation of the second sun gear is selectively transmitted;

a winding spool that rotates together with the spool gear to wind up the film pulled out of the film cartridge;

a first transmission mechanism for transmitting a driving force of the first sun gear to drive the spindle gear in the film-rewinding direction;

a second transmission mechanism for transmitting the driving force of the first sun gear to drive the spindle gear in the film-thrusting direction;

a third transmission mechanism for transmitting the driving force of the first sun gear to the light-lock door driving gear; and a fourth transmission mechanism for transmitting a driving force of the second sun gear to the spool gear, wherein transmission of the driving force of the motor is switched by selecting at least one of the second to fourth transmission mechanisms by first rotating the spindle gear in the film-rewinding direction to bring the cam into a predetermined rotation position and then reversing a rotation direction of the motor.

9. A camera as claimed in claim 8, further comprising:

a first planet gear that is kept in planet-like movement by rotation of the first sun gear and that can be engaged with the spindle gear only when the motor is rotating in a forward direction; and a second planet gear that is kept in planet-like movement by rotation of the first sun gear and that can be engaged with the light-lock door driving gear only when the motor is rotating in a reverse direction, wherein the second planet gear engages with the light-lock door driving gear when the rotation direction of the motor is reversed on condition that an indicator plate provided inside the film cartridge so as to rotate together with the spindle gear is in a position in which one of marks formed as openings in the film cartridge so as to indicate status of the film is indicated with a specific color when the first planet gear engages with the spindle gear while the motor is rotating in the forward direction.

10. A camera as claimed in claim 9, wherein a single planet gear serves as both the first and second planet gears.

11. A camera as claimed in claim 8, further comprising:

a first planet gear that is kept in planet-like movement by rotation of the first sun gear, that can be engaged with the spindle gear only when the motor is rotating in a forward direction, and that can rotate the spindle gear in the direction in which the film is rewound back into the film cartridge; and a second planet gear that is kept in planet-like movement by rotation of the first sun gear, that can be engaged with the spindle gear only when the motor is rotating in a reverse direction, and that can rotate the spindle gear in the direction in which the film is thrust out of the film cartridge, wherein the second planet gear engages will the spindle gear when the rotation direction of the motor is reversed on condition that an indicator plate provided inside the film cartridge so as to rotate together with the spindle gear is in a first predetermined position other than a position in which one of marks formed as openings in the film cartridge so as to indicate status of the film is indicated with a specific color when the first planet gear engages with the spindle gear while the motor is rotating in the forward direction.

12. A camera as claimed in claim 11, further comprising:

a third planet gear that is kept in planet-like movement by rotation of the second sun gear, that can be engaged with the spool gear only when the motor is rotating in the reverse direction, and that can rotate the spool gear in a direction in which the film is wound up around the winding spool, wherein the second planet gear disengages from the spindle gear and the third planet gear engages with the spool gear when the rotation direction of the motor is reversed on condition that the indicator plate is in a second predetermined position other than the position in which one of the marks is indicated with a specific color and other than the first predetermined position when the first planet gear engages with the spindle gear while the motor is rotating in the forward direction.

13. A camera as claimed in claim 11, wherein, when the first planet gear engages with the spindle gear, a first planet gear carrier holding the first planet gear is kept in contact with a second planet gear carrier holding the second planet gear.

14. A camera as claimed in claim 11, wherein, when the spindle gear rotates in the direction in which the film is thrust out of the film cartridge, an engagement member that is kept in contact with the cam is engaged with an engagement surface formed on the cam in such a way as to cancel a frictional force existing between the spindle gear and the cam.

15. A camera as claimed in claim 11, further comprising:

large-diameter planet gear that constitutes a part of the second planet gear and that is engaged with the first sun gear;

a small-diameter planet gear that constitutes a part of the second planet gear and that can be engaged with the spindle gear; and two-stage cam surfaces that constitute the cam, wherein, when the second planet gear engages with the spindle gear, the large-diameter planet gear is placed near the first-stage cam surface, and a part of the large-diameter planet gear overlaps with a part of the second-stage cam surface when seen from above the camera.

16. A camera as claimed in claim 1, wherein the cam is so shaped that, when the spindle gear is rotating in the direction in which the film is rewound back into the film cartridge, the position of the cam relative to the spindle gear can be determined uniquely.

17. A camera as claimed in claim 8, wherein the cam is so shaped that, when the spindle gear is rotating in the direction in which the film is rewound back into the film cartridge, the position of the cam relative to the spindle gear can be determined uniquely.

18. A camera as claimed in claim 1, wherein the cam is disposed opposite the film cartridge, with the spindle gear between them.

19. A camera as claimed in claim 8, wherein the cam is disposed opposite the film cartridge, with the spindle gear between them.

20. The camera of claim 8, wherein the spindle gear rotates in a like direction during thrust driving and during wind-up driving.

21. A camera comprising:

at least one motor;

a driving member for rewinding a film as the motor is rotated forward and for thrusting the film as the motor is rotated backward;

a cam that rotates together with the driving member when the driving member is rotated in a direction in which the film is rewound and that does not receive rotational force of the driving member when the driving member is rotated in a direction in which the film is thrust; and a transmission mechanism that drives the cam to a predetermined position and keeps the cam in that position when the motor is rotated forward and that transmits a driving force selectively to a transmission destination corresponding to the predetermined position by coming into contact with the cam that is being kept in the predetermined position when the motor is rotated backward.

22. A camera as claimed in claim 21, wherein the driving member is a transmission destination.

23. A camera as claimed in claim 21, wherein there are two of the predetermined positions, of which a first is a position in which the driving force is transmitted to thrust the film and a second is a position in which the driving force is transmitted to wind up the film.

24. A camera as claimed in claim 21, wherein there are two of the predetermined positions, of which a first is a position in which the driving force is transmitted to thrust the film and a second is a position in which the driving force is transmitted to open and close a light-lock door.

25. A camera as claimed in claim 21, wherein there are two of the predetermined positions, of which a first is a position in which the driving force is transmitted to thrust the film and a second is a position in which the driving force is transmitted to open and close a light-lock door.

26. A camera as claimed in claim 25, wherein there are two or more of the third predetermined positions.

* * * * *